(12) United States Patent
Sakamoto et al.

(10) Patent No.: US 9,821,612 B2
(45) Date of Patent: Nov. 21, 2017

(54) TIRE

(71) Applicant: BRIDGESTONE CORPORATION, Chuo-ku, Tokyo (JP)

(72) Inventors: Takashi Sakamoto, Kodaira (JP); Takahiro Miura, Kodaira (JP); Daisuke Nakagawa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 682 days.

(21) Appl. No.: 14/371,340

(22) PCT Filed: Jan. 8, 2013

(86) PCT No.: PCT/JP2013/000014
§ 371 (c)(1),
(2) Date: Jul. 9, 2014

(87) PCT Pub. No.: WO2013/105482
PCT Pub. Date: Jul. 18, 2013

(65) Prior Publication Data
US 2014/0360645 A1  Dec. 11, 2014

(30) Foreign Application Priority Data

Jan. 11, 2012 (JP) .................................. 2012-003139
Jan. 12, 2012 (JP) .................................. 2012-004443
Apr. 6, 2012 (JP) .................................. 2012-087220

(51) Int. Cl.
*B60C 13/04* (2006.01)
*B60C 13/00* (2006.01)
(Continued)

(52) U.S. Cl.
CPC .......... *B60C 13/002* (2013.01); *B60C 1/0025* (2013.01); *B60C 13/02* (2013.01);
(Continued)

(58) Field of Classification Search
CPC .......................... B60C 13/04; B60C 2013/045
See application file for complete search history.

(56) References Cited

U.S. PATENT DOCUMENTS

| 4,343,342 A | 8/1982 | McDonald |
| 5,300,164 A * | 4/1994 | DeTrano ............... B29D 30/72 |
| | | 152/524 |

(Continued)

FOREIGN PATENT DOCUMENTS

| CN | 1741913 A | 3/2006 |
| CN | 102010561 A | 4/2011 |

(Continued)

OTHER PUBLICATIONS

Rodgers, B., Waddell, W. H. and Klingensmith, W. 2004. Rubber Compounding. Encyclopedia of Polymer Science and Technology. Published Online: Jul. 15, 2004.*

(Continued)

*Primary Examiner* — Justin Fischer
*Assistant Examiner* — Robert Dye
(74) *Attorney, Agent, or Firm* — Sughrue Mion, PLLC

(57) ABSTRACT

The present invention provides a tire including a side portion (104), a black rubber layer (113), a stain-preventing rubber layer (112) disposed adjacent to the black rubber layer, and a colored layer (111) disposed on the surface of the stain-preventing rubber layer and exposed on the outer surface of the side portion; a tire including a colored layer (207) disposed on the outer surface of the tire, and an underlayer rubber (208) disposed on the tire-interior side of the colored layer, wherein the colored layer is formed by curing a UV-curable paint; and a tire including a colored layer (302) on the surface of the side portion (301) of the tire, wherein the colored layer includes a marking (303).

6 Claims, 12 Drawing Sheets

(51) Int. Cl.
  *B60C 1/00* (2006.01)
  *B60C 13/02* (2006.01)
  *C08K 5/00* (2006.01)

(52) U.S. Cl.
  CPC .............. *B60C 13/04* (2013.01); *C08K 5/005* (2013.01); *B60C 2013/005* (2013.01); *B60C 2013/007* (2013.01); *B60C 2013/045* (2013.01)

(56) References Cited

U.S. PATENT DOCUMENTS

| | | | |
|---|---|---|---|
| 7,398,810 B2 * | 7/2008 | Peyron | B60C 13/001 152/209.1 |
| 2003/0037854 A1 | 2/2003 | Suzuki | |

FOREIGN PATENT DOCUMENTS

| | | | |
|---|---|---|---|
| DE | 3924459 | * | 3/1990 |
| DE | 602004001129 T2 | | 11/2006 |
| EP | 1974958 A1 | | 10/2008 |
| EP | 2805836 A1 | | 11/2014 |
| JP | 4-121205 A | | 4/1992 |
| JP | 7-164832 A | | 6/1995 |
| JP | 8-25920 A | | 1/1996 |
| JP | 10-222070 A | | 8/1998 |
| JP | 2971545 B2 | | 11/1999 |
| JP | 2000-198324 A | | 7/2000 |
| JP | 2003-54225 A | | 2/2003 |
| JP | 2004-526814 A | | 9/2004 |
| JP | 2008-290500 A | | 12/2008 |
| JP | 2009-520616 A | | 5/2009 |
| JP | 2010-100090 A | | 5/2010 |
| JP | 2010-125440 A | | 6/2010 |

OTHER PUBLICATIONS

English machine translation of DE3924459, no date.*
English machine translation of JP04-121205, no date.*
International Search Report of PCT/JP2013/000014 dated Apr. 23, 2013.

* cited by examiner

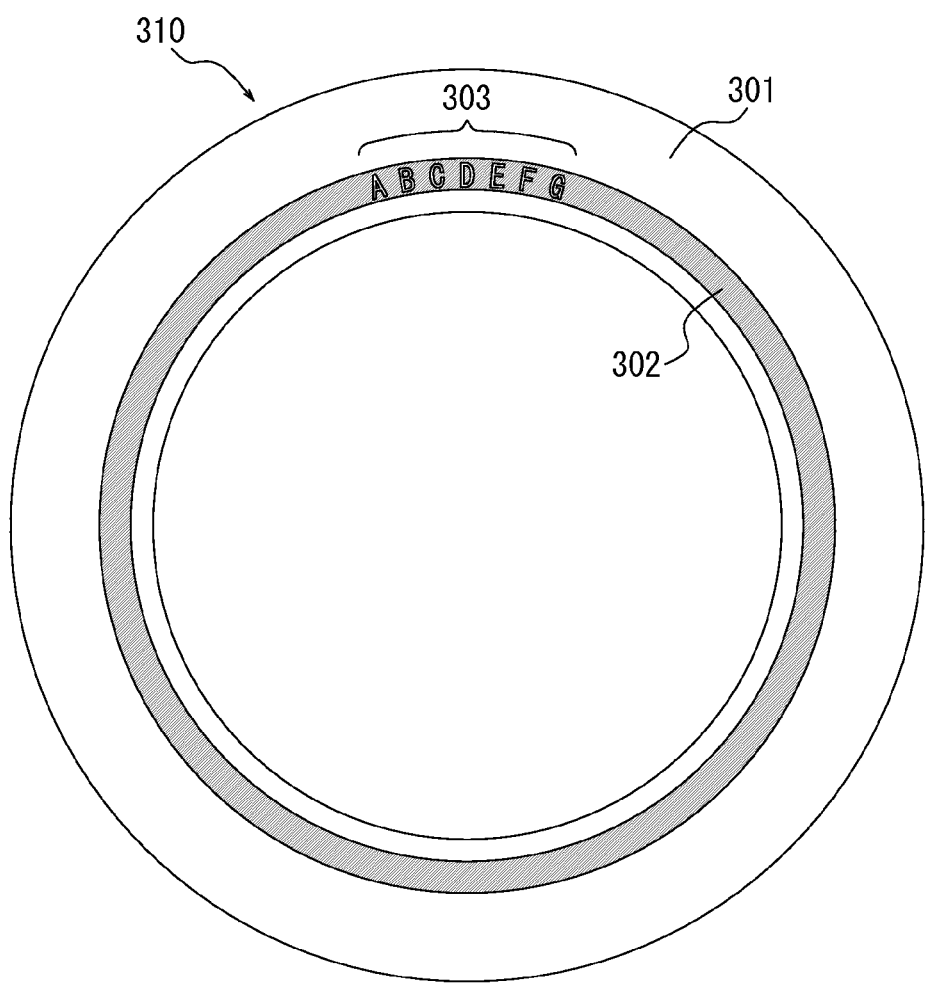

TIRE

CROSS REFERENCE TO RELATED APPLICATIONS

This application is a National Stage of International Application No. PCT/JP2013/000014, filed on Jan. 8, 2013, which claims priority from Japanese Patent Application No. 2012-003139, filed on Jan. 11, 2012, Japanese Patent Application No. 2012-004443, filed on Jan. 12, 2012, and Japanese Patent Application No. 2012-087220, filed on Apr. 6, 2012, the contents of all of which are incorporated herein by reference in their entirety.

TECHNICAL FIELD

The present invention relates a tire, including both pneumatic tire and solid tire.

BACKGROUND ART

Tires are conventionally provided with colored layers (orh painted layers) to place decorations and the like on the outer surfaces of the side portions. Such tires, now being widely available, include non-staining or slightly-staining sidewall innerlayer rubbers, which do not contain staining antioxidants, to prevent the decorative parts from being stained by the antioxidants contained in the surrounding rubber. Refer to JP H4-121205 (PTL 1). This technique conventionally known in the art allows the decorative parts to be disposed apart from the black rubber layer that contains antioxidants.

Coloring on tires, such as surface painting and printing, has been also widely performed to improve decorativeness or visibility of tires. In such coloring, although a heat-curable or a solvent-volatiling paint has been generally used, an ultraviolet (UV) curable paint are now being widely used. This is because the UV-curable paint cures much more rapidly than the heat-curable or solvent-volatilizing painting and requires less amount of organic solvent and no heat in curing to be less likely to cause quality changes in the based material. For example, JP 2010-125440 A (PTL 2) discloses a method of decorating tires using a UV-curable ink. JP 2004-526814 (PTL 3) and JP 2009-520616 (PTL 4) disclose a tire having a colored layer made of a polyurethane layer on its sidewall. As mentioned above, rubber members disposed on the outer surface of a tire, such as a sidewall, generally contain antioxidants and the like to prevent the degradation caused by ozone or UV light. It is known that such antioxidants gradually migrate toward the tire surface over time as the tire is used.

Tires are also conventionally provided with markings such as corporate name, brand name, tire size, the date of manufacture, etc. that are placed on the outer surfaces of their side portions, i.e., the outer surfaces of their sidewalls and beads. The markings may include character(s), figure(s), sign(s) including bar codes, pattern(s) or any combination thereof. Refer for example to JP 2010-100090 A (PTL 5). Such markings are placed on the surface of the tire by printing or painting, by attaching a decorated seal, or by exposing an embedded colored rubber. In typical tires, which are black in their base color, markings are imprinted in white color on the black background. Because the surface of the side portion of tire tends to become dirty, the white markings on the black background may become less visible as the tire is used. In addition, there is a demand for stimulating purchasing interest by emphasizing the markings of unused, new tires. To satisfy such a demand, coloring on marking portions has been proposed for example by PTLs 2, 3, and 4. PTL 2 discloses a method for printing markings on tires by using UV-curable ink, and PTLs 3 and 4 propose providing a colored layer made of polyurethane on the sidewall of a tire.

CITATION LIST

Patent Literatures

PTL 1: JP H4-121205 A
PTL 2: JP 2010-125440 A
PTL 3: JP 2004-526814 A
PTL 4: JP 2009-520616 A
PTL 5: JP 2010-100090 A

SUMMARY OF INVENTION

Technical Problem

However, when the multiple kinds of rubber layers are disposed on the side portion as mentioned above, the difference in deformation behavior in each kinds of rubber, which occurs when the tire rolls under a load, creates concentration of stress around the adhering interface between the rubber layers. In addition, the non-staining or slightly-staining sidewall innerlayer rubber, which is of a different type from the surrounding black rubber, adheres poorly to the black rubber. These disadvantages may cause detachment at the adhered interface of the rubbers. In light of this, a first object of the present invention is to solve the aforementioned problems associated with the conventional tire having a colored layer to provide decorations or markings on its outer surface of the side portion thereon. The tire designed to achieve the above object is provided with a colored layer that is not stained by the antioxidant and the like contained in the surrounding black rubber layer, and is as well provided with rubber layers that do not detach from each other at the interface therebetween.

The antioxidant, which has the effect of preventing the degradation of rubber due to UV radiation, may also has an effect of blocking the UV curing of the paint. Thus, the UV-curable paint, which later changes into the colored layer, applied on the outer surface, e.g. sidewall, of a common tire exhibit very low curability. Furthermore, additives contained in the tire, such as antioxidant, tend to precipitate toward the outer surface of the tire. These may gradually reduce the adhesion force between the applied paint (i.e., colored layer) and the rubber disposed under the applied paint, and may ultimately cause the detachment between those rubber layers. In light of this, a second object of the present invention is to provide a tire having high curability in the UV-curable paint, as well as having a colored layer made of a UV-curable paint that can be firmly adhered to the rubber layer.

Further, the colored layer formed on the surface of the side portion of the tire by ink printing may crack or fissure as the tire is used, ultimately making the markings invisible. Similarly, the colored layer formed of polyurethane may crack or eventually fissure as the tire is used. In light of this, a third object of the present invention is to provide a tire that would not cause a crack in the colored layer, which has a color that is different from the base color of the tire to increase the visibility of markings imprinted on the surface of the side portion.

Solution to Problem

An outline of the present invention for achieving the first object is as follows:

(1) A tire comprising a tread for contacting with a road surface, and a side portion that extends continuously from the tread, wherein:

the side portion includes a black rubber layer containing an antioxidant, a stain-preventing rubber layer disposed adjacent to the black rubber layer, and a colored layer disposed on a surface of the stain-preventing rubber layer oriented outwardly in a tire width direction, the colored layer being exposed on an outer surface of the side portion; and the stain-preventing rubber layer has an outermost edge in a tire radial direction, which is located radially inwardly relative to a position where the tire has the maximum width.

An outline of the present invention for achieving the second object is as follows:

(2) A tire comprising a colored layer disposed on at least a part of an outer surface of the tire, and an underlayer rubber disposed on a tire-interior side of the colored layer, wherein:

the colored layer is formed by curing an ultraviolet curable paint, and the underlayer rubber has a rubber composition containing 0 to 1.5 mass parts an antioxidant per 100 mass parts a rubber component.

An outline of the present invention for achieving the third object is as follows:

(3) A tire comprising a colored layer on a surface of at least one side portion of the tire, the colored layer being of a color different from a base color of the tire, and including a marking imprinted thereon, the marking being of a color different from the color of the colored layer, wherein the colored layer has a distance of 4.0 mm or less from ply cords of a carcass.

Advantageous Effect of Invention

According to one aspect of the present invention, there is provided the tire designed to prevent the colored layer from being stained by the antioxidant and the like contained in the surrounding black rubber layer. The tire is also designed to effectively prevent the rubber layers from detaching from each other between their interface.

According to another aspect of the present invention, the tire includes the colored layer formed by curing a UV-curable paint, and the underlayer rubber disposed on the tire-interior side of the colored layer. The underlayer rubber includes a rubber composition containing 0 to 1.5 mass parts antioxidant per 100 mass parts rubber component. The UV-curable paint forming the colored layer exhibits high curability, and the colored layer firmly adheres to the underlyer rubber. According to a preferred aspect of the present invention, the rubber composition used for the underlayer rubber contains non-diene-based rubber as at least part of its rubber component. Such a tire has the colored layer that is firmly adhered to the underlayer rubber, and exhibits high weather resistance.

According to still another aspect of the present invention, the marking placed on the colored layer provided on the surface of the tire side portion is highly visible and the colored layer exhibits high durability against cracks.

BRIEF DESCRIPTION OF DRAWINGS

FIG. 7 is a side view of a tire in accordance with one embodiment of the present invention.

DESCRIPTION OF EMBODIMENTS

<Embodiment Relating to First Object>

A first tire of the present invention achieving the aforementioned first object will be described in further detail hereinafter, by illustrating an embodiment of the tire. The first tire of the present invention includes a tread for contacting with a road surface and a side portion that extends continuously from the tread. The side portion includes a black rubber layer containing an antioxidant, a stain-preventing rubber layer disposed adjacent to the black rubber layer, and a colored layer disposed on the surface of the stain-preventing rubber layer that is oriented outwardly in the tire width direction. The colored layer is exposed on the outer surface of the side portion. The stain-preventing rubber layer includes the outermost edge in the tire radial direction that is located radially inwardly relative to the position where the tire has the maximum width.

According to the first tire of the present invention, the colored layer is disposed on the surface of the stain-preventing rubber layer that is oriented outwardly in the tire width direction. This arrangement positions the stain-preventing rubber layer to be interposed between the colored layer and the block rubber layer. The stain-preventing rubber layer limits the migration of the antioxidant contained in the black rubber layer toward the colored layer to thereby prevent the colored layer from being stained by the antioxidant. Further according to the first tire of the present invention, the interface between the rubber layers and its surroundings are not subjected to a large tensile deformation even when the tire rolls under a load. The rubber layers thus do not detach from each other between their interfaces.

Figure 1:
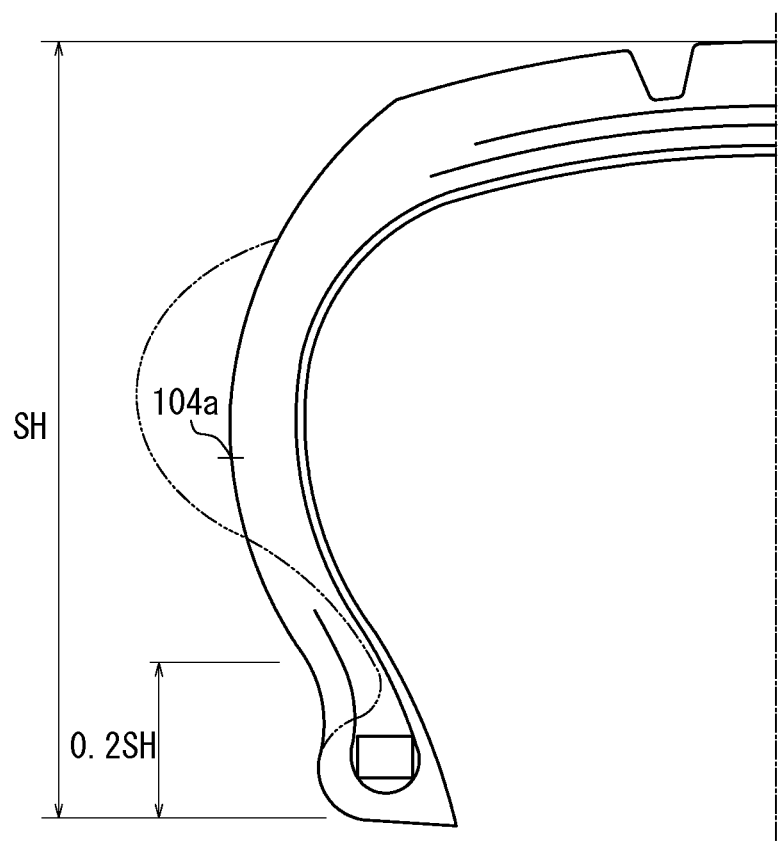
FIG. 1 is a cross-sectional view of a tire as seen in the tire width direction, in which deformation on the outer surface of a side portion that occurs when the tire rolls under a load is exaggeratingly shown.

In the following, how the detachment between the rubber layers can be prevented is described in detail. In FIG. 1, the deformation of the side portion of a tire, which occurs when the tire rolls under a load, is exaggeratingly shown with a virtual line. As shown in FIG. 1, the amount of the tensile deformation, caused when the tire rolls under a load, reaches its peak near a point 104a where the tire has the maximum width, and gradually decreases at further distances from the point 104a toward the radial interior. In the tire of the present invention, the boundary lines between the stain-preventing rubber layer and the black rubber layer are located in the area where the amount of tensile deformation is small, or specifically in the area that is radially interior relative to the point where the tire has the maximum width. This arrangement effectively prevents the detachment of the rubber layers at the interface thereof.

The stain-preventing rubber layer of the first tire of the present invention preferably includes a rubber having an air permeability lower than that of the black rubber layer. In this case, the stain-preventing rubber layer interposed between the colored layer and the black rubber layer effectively limits the migration of the antioxidant contained in the black rubber layer toward the colored layer, further effectively preventing the colored layer from being stained by the antioxidant.

Preferably, the radially innermost edge of the stain-preventing rubber layer is located at a radial position that is radially outwardly away from the bead toe by at least 20% the length of the cross-sectional height (SH) of the tire. The innermost edge located at the above position can avoid a large compression-deformation even when the tire rolls under a load, so that the detachment of the layers can be further effectively prevented.

Conversely, when the radially innermost edge of the stain-preventing rubber layer is located at a radial position that is radially outwardly away from the bead toe by less than 20% the length of the cross-sectional height (SH) of the tire, the radially innermost edge of the stain-preventing rubber layer would be subjected to a large compression-deformation when the tire rolls under a load, as shown in FIG. 1. In this case, the detachment is highly likely to occur.

In addition, the colored layer arranged on the radially-exterior side of the tire can provide enhanced decorativeness and higher visibility of markings. In light of this advantage, locating the radially innermost edge of the stain-preventing rubber layer at the aforementioned radial position, which is sufficiently away from the bead toe, is even more preferable in terms of the decorativeness and the visibility.

Further, in the first tire of the present invention, the radially inner and outer boundary lines between the stain-preventing rubber layer and the black rubber layer are preferably inclined with respect to normal lines to the outer surface of the side portion, in the cross-section as seen in the tire width direction. More specifically, each of the boundary lines is preferably inclined with respect to the normal line that extend from the position where the boundary line intersects with the outer surface of the side portion, such that the axially inner end of the boundary line extends in a direction toward or away from the rotational axis of the tire. Also preferably, the radially inner boundary line and the radially outer boundary line are inclined in the opposite directions with respect to the rotational axis. The boundary lines accordingly inclined can provide a larger contact area between the rubber layers than the boundary lines that are vertical to the outer surface of the side portion. With such a larger contact area, the stress caused when the tire rolls under a load would not be concentrated on the interface of the rubber layers, so that the detachment between the rubber layers can be effectively prevented with the less amount of deformation.

Further, in the above arrangement, the boundary lines between the stain-preventing rubber layer and the black rubber layer are preferably inclined within an angular range of 10 to 60 degrees with respect to the normal lines to the outer surface of the side portion, in the cross-section as seen in the tire width direction. The normal lines extend from the points where the boundary lines intersect with the outer surface of the side portion. The boundary lines inclined in such an angular range can provide an even larger contact area between the rubber layers. With such a larger contact area, the concentration of stress at the interface of the rubber layers, occurring when the tire rolls under a load, would be further alleviated, so that the detachment between the rubber layers can be more effectively prevented with the less amount of deformation.

Conversely, the boundary lines having the inclination angle of less than 10 degrees would have a smaller contact area between the rubber layers, so that the detachment at the interface between the rubber layers is likely to occur. Similarly, the boundary lines having the inclination angle exceeding 60 degrees is likely to result in detachment at the interface between the rubber layers.

In this embodiment, the colored layer preferably has a minimum distance D of at least 1 mm from the black rubber layer, with the stain-preventing rubber layer interposed therebetween. In this case, the stain-preventing rubber layer effectively and sufficiently limits the migration of the antioxidant from the black rubber layer toward the colored layer to thereby further effectively prevent staining of the colored layer.

Conversely, when the colored layer has a minimum distance of less than 1 mm from the black rubber layer, with the stain-preventing rubber layer interposed therebetween, the stain-preventing rubber layer would fail to effectively and sufficiently limit the migration of the antioxidant from the black rubber layer, potentially allowing the staining of the colored layer.

In the cross-section of such a tire as seen in the tire width direction, the surface of the stain-preventing rubber layer oriented outwardly in the tire width direction preferably has a length that is at least 5 mm and 40% or less the length of the cross-sectional height (SH) of the tire between the radially outermost point and the radially innermost point of the stain-preventing rubber layer along the surface. The stain-preventing rubber layer having this surface length allows the colored layer provided on the surface of the stain-preventing rubber layer to sufficiently exhibit its decorativeness, simultaneously effectively preventing the colored layer from being stained by the antioxidant and the rubber layers from detaching from each other at the interface thereof.

Conversely, when the surface of the stain-preventing rubber layer oriented outwardly in the tire width direction has a length of less than 5 mm between the radially outermost point and the radially innermost point of the stain-preventing rubber layer along the surface in the cross-section as seen in the tire width direction, the surface of the stain-preventing rubber layer may fail to provide the colored layer with a sufficient radial width to exhibit the decorativeness of the colored layer sufficiently. Moreover, because the colored layer is disposed relatively close to the black rubber layer which surrounds the stain-preventing layer in this case, the stain-preventing rubber layer may fail to effectively limit the migration of the antioxidant contained in the black rubber layer, potentially allowing the staining of the colored layer. On the other hand, when the length along the surface is greater than 40% the length of the cross-section height (SH) of the tire, the stain-preventing layer would be at least in part located in the region that may be largely deformed when the tire rolls under a load. This may potentially cause the detachment at the interface between the rubber layers.

Furthermore, the stain-preventing rubber layer is preferably shaped at least in part to define a recess depressed from the surrounding outer surfaces of the side portion in the tire width direction, to place the colored layer inside relative to the surrounding outer surface of the side portion in the tire width direction. In this case, the outer surface of the side portion would not be rubbed against curbstones to thereby effectively prevent the colored layer from being damaged. This allows the decoration on the tire to retain its intended appearance for a long period of time.

In the embodiment, the stain-preventing rubber layer preferably contains butyl-based rubber.

Examples of the butyl-based rubber include, for example, butyl rubber and halogenated butyl rubber.

The butyl-based rubber exhibits extremely low air permeability, so that it effectively limits the permeation of the compounding agents, such as antioxidant, contained in the rubber composition.

The stain-preventing rubber layer containing the butyl-based rubber thus effectively limits the migration of the antioxidant or the like precipitated from the black rubber layer, to thereby effectively prevent the colored layer from being discolored by the antioxidant.

To more effectively prevent the discoloring, the stain-preventing rubber layer preferably contains 80 mass parts or greater butyl-based rubber per 100 mass parts rubber component. The stain-preventing rubber layer containing less than 80 mass parts may potentially fail to sufficiently and effectively prevent the migration of the antioxidant from the black rubber layer toward the colored layer.

Further preferably, the stain-preventing rubber layer contains an inorganic clay mineral. The inorganic clay mineral contained in the stain-preventing rubber layer will further reduce lower the air permeability of the rubber, and thus the amount of the antioxidant that passes through the stain-preventing rubber layer can be more effectively reduced. The stain-preventing rubber layer containing an inorganic clay mineral thus effectively prevents the colored layer from being stained by the antioxidant contained in the black rubber layer.

Examples of the inorganic clay mineral include, for example, kaolin clay, clay, mica, feldspar, and hydrate composite of silica and alumina. However, other inorganic clay minerals can be also used. The stain-preventing rubber layer preferably contains 10 to 150 mass parts inorganic clay mineral per 100 mass parts rubber component of the rubber composition.

The inorganic clay mineral preferably has a sheet-like or plate-like shape when added to the stain-preventing rubber layer in the embodiments of the present invention. The inorganic clay mineral of such a shape added to the rubber component forms a layer structure therein particularly when undergoing the extruding or rolling step. This layer structure blocks the pathway of air in the stain-preventing rubber layer, so that the stain-preventing rubber layer can further lower the its air permeability.

Further in the first tire, the colored layer preferably has a thickness of 150 μm or less. The colored layer having a thickness of 150 μm or less would not peel off even when the tire rolls under a load.

Conversely, the colored layer having a thickness exceeding 150 μm is likely to peel off when the tire rolls under a load, because the colored layer of such a large thickness may be subjected to a large deformation when the side portion is bent or deformed as the tire rolls under a load. Further, the colored layer having the thickness exceeding 150 μm is likely to be rubbed against curbstones, which may also cause the peeling of the colored layer.

Preferably, the stain-preventing rubber layer and the ply cords of the carcass have a side rubber interposed therebetween. Because the side rubber can reduce the hysteresis loss better than the stain-preventing rubber, the tire having a side rubber between the carcass ply cord and the stain-preventing rubber reduces the rolling resistance of the tire.

An embodiment of the first tire of the present invention will be described in further detail hereinafter, with reference to the accompanying drawings.

The description below is, however, only exemplary, and thus the configuration of each member or the operation effect is not limited to thereto.

Figure 2:
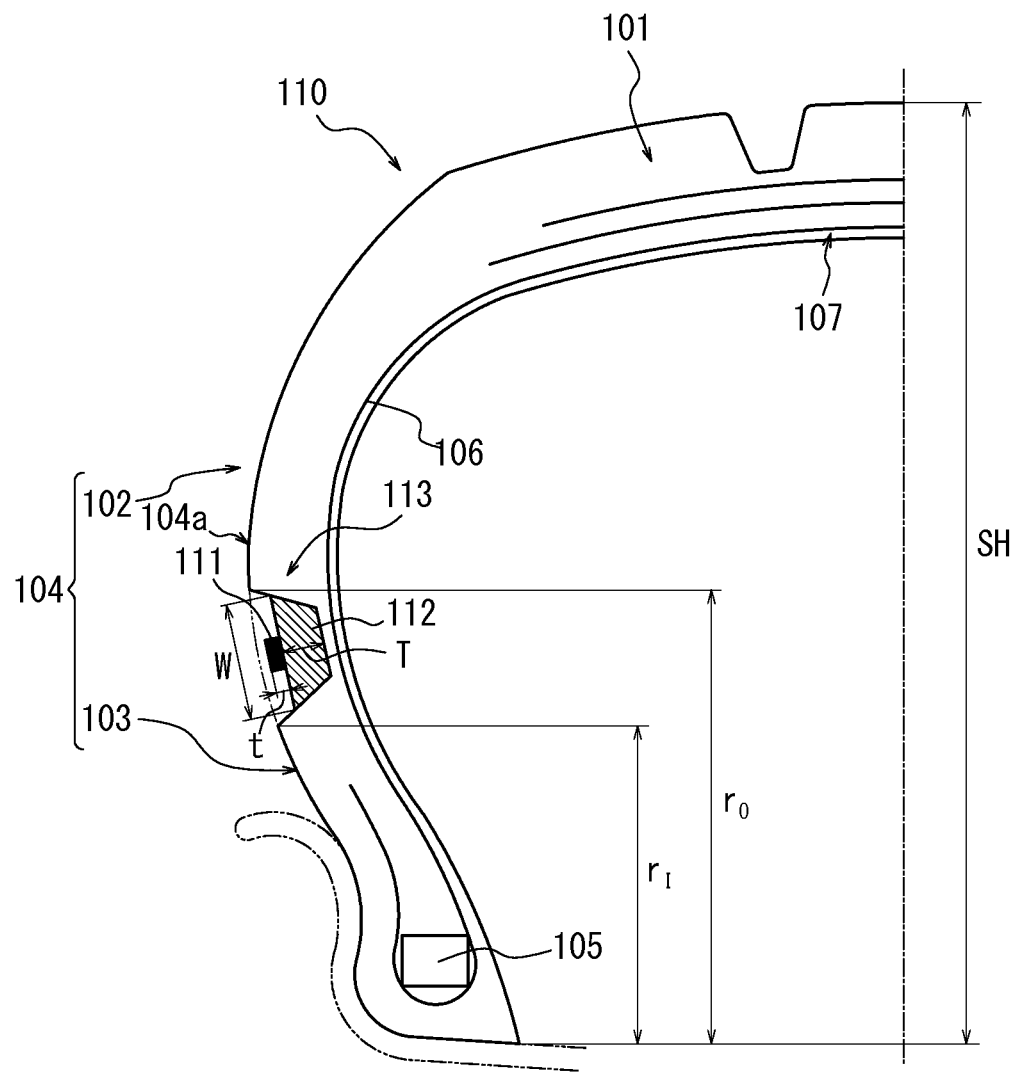
FIG. 2 is a cross-sectional view of a tire, as seen in the tire width direction, according to one embodiment of the present invention, in which the tire is mounted on an applicable rim, filled with an air of a predetermined internal pressure, and being subjected to no load.

A tire 110 shown in FIG. 2 includes a tread 101, sidewalls 102 extending continuously from the radial inner edges of the lateral faces of the tread 101 toward the radial tire-interior side, and beads 103 radially extending continuously from the radial inner edges of the side walls 102.

The sidewalls 102 and the beads 103 are collectively called side portions 104.

The tire 110 further includes a carcass ply 106 extending between the pair of beads 103, which enables the radial arrangement. The carcass ply 106 toroidally extends from the tread 101 to each of the beads 103 through each of the sidewalls 102. The carcass ply is locked at bead cores 105, formed inside the corresponding beads 103, by for example being folded along each bead core 105 from the inner side to the outer side in the tire width direction.

The tire also includes an inner liner 107 disposed circumferentially inwardly along to the carcass ply 106.

Figure 3:
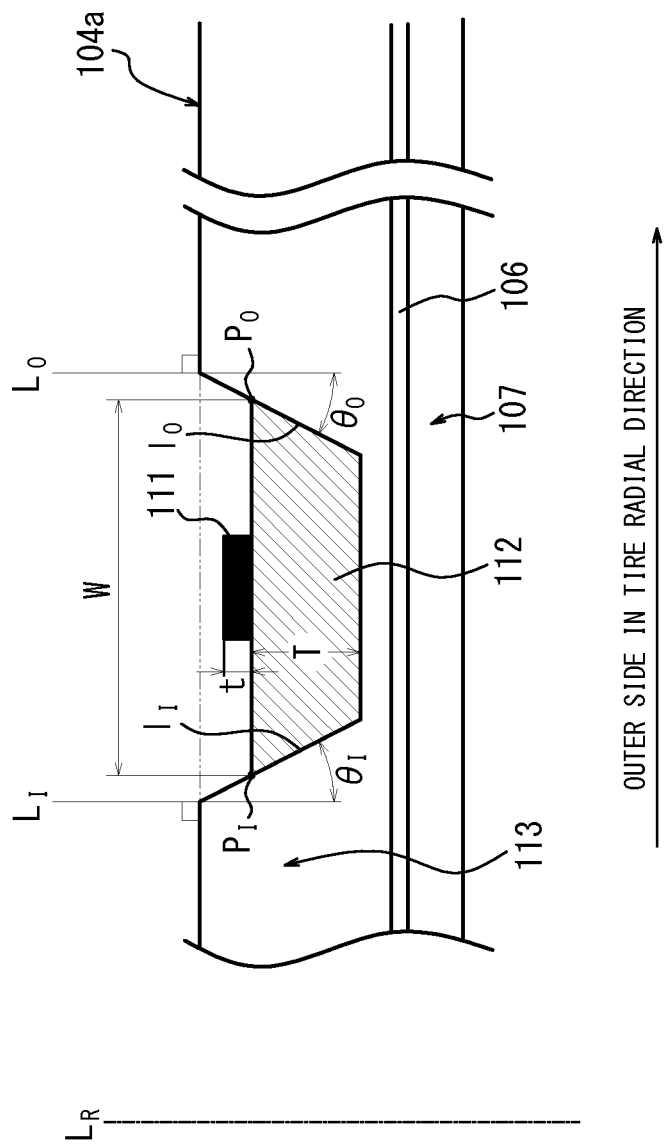
FIG. 3 is an enlarged, partial cross-sectional view of a colored layer and its surrounding portions of the tire shown in FIG. 2.
Figure 4:
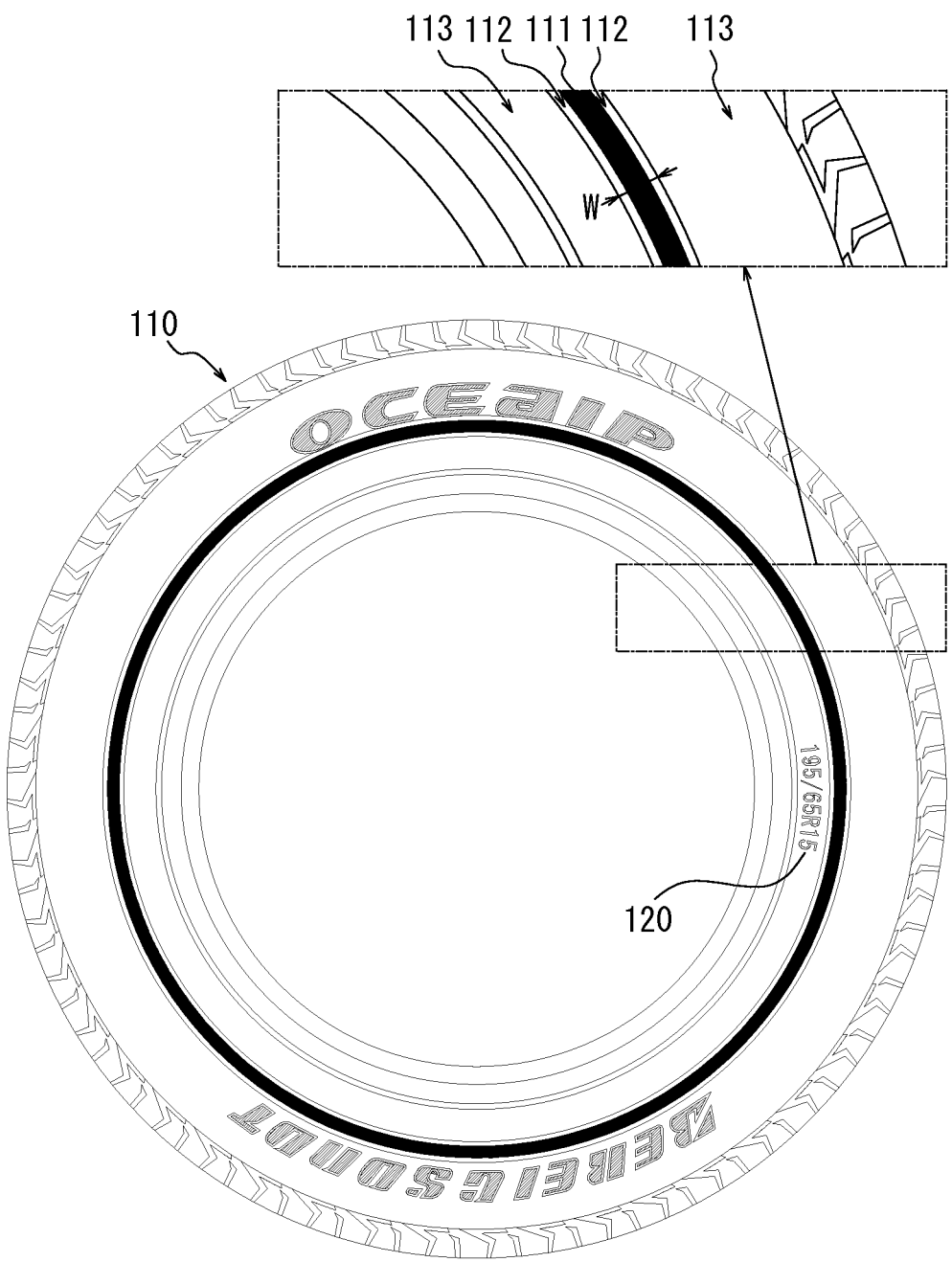
FIG. 4 is a side view of the tire shown in FIG. 2.

As shown in FIGS. 2 to 4, the side portion 104 of the tire 110 includes a colored layer 111 exposed on the outer surface of the side portion 104, a stain-preventing rubber layer 112 whose surface is oriented outwardly in the tire width direction (i.e., left side in FIG. 2), and a black rubber layer 113 that forms most of the side portion 104. The colored layer 111 is formed on the stain-preventing rubber layer 112. The black rubber layer 113 is disposed on both of the radially inner and radially outer sides of the stain-preventing rubber layer 112. The colored layer 111 is separated from the black rubber layer 113 by the stain-preventing rubber layer 112.

As shown in FIG. 4, the colored layer 111 can be formed continuously along the circumference of the tire in a ring shape. The ring-shaped colored layer enables markings (not shown), such as characters, figures, signs including bar codes, and patterns, to be shown circumferentially along the tire.

The colored layer 111 may be of any color.

The colored layer 111 may be formed by printing a paint on the surface of the stain-preventing rubber layer 112. More specifically the colored layer 111 may be formed, for example, by jetting, through the head of an ink jet printer, a paint containing an ink to the surface of the stain-preventing rubber layer 112 of a tire that has been vulcanized and molded. The colored layer 111 may also be formed by applying several kinds of paints.

The colored layer 111 having a maximum thickness of at most 150 μm can effectively avoid the peeling caused due to a large deformation, which occurs to the colored layer 111 when the tire rolls under a load. The colored layer 111 within that thickness can also avoid the peeling caused due to scrapes against curbs.

Although the colored layer 111 of the tire 110 shown in the drawings has a constant thickness t along the surface of the stain-preventing rubber layer 112 on which the colored layer 111 is provided, the thickness of the colored layer may not be constant along the surface. The colored layer not having a constant thickness along the surface, however, preferably has a thickness of at most 150 μm at its thickest part.

The thickness t is measured in the extending direction of the normal line to the surface of the stain-preventing rubber layer 112.

The rubber composition of the stain-preventing rubber layer 112 may be prepared by arbitrarily combining components that are commonly used for preparing the rubber composition of normal tires. Examples of the rubber component include natural rubber (NR), butyl rubber (IIR), halogenated butyl-rubber, isoprene rubber (IR), butadiene rubber (BR), styrene-butadiene rubber (SBR), chloroprene rubber (CR), acrylonitrile-butadiene rubber (NBR), and ethylene-propylene-diene terpolymer (EPDM). These components may be added alone or in combination of two or more thereof. When the stain-preventing rubber layer 112 contains ethylene-propylene-diene terpolymer, the amount of the ethylene-propylene-diene terpolymer contained in the stain-preventing rubber layer 112 is preferably 80 mass parts or more per 100 mass parts rubber component.

The stain-preventing rubber layer 112 containing butyl-based rubber can block the antioxidant from passing though the stain-preventing rubber layer 112. The stain-preventing rubber layer 112 containing butyl-based rubber can thus prevents the staining of the colored layer 111 caused due to the antioxidant contained in the black rubber layer 113.

The stain-preventing rubber layer 112 containing an inorganic clay-mineral can further effectively block the antioxidant from passing through the stain-preventing rubber layer 112. The stain-preventing rubber layer 112 containing an inorganic clay-mineral can thus prevent the staining of the colored layer 111 caused due to the antioxidant contained in the black rubber layer 113 more effectively. The stain-preventing rubber layer may be formed by using other materials that can block the antioxidant from passing through the stain-preventing rubber layer.

To increase the weather resistance of tires by preventing the rubber of the tire from being degraded due to ozone or heat under use, an amine antioxidant or the like is used as a staining antioxidant, and a phenolic antioxidant or the like is used as a non-staining antioxidant. The staining antioxidant generally exhibits higher antioxidant effect than the non-staining antioxidant, but it stains the colored layer 111 more rapidly than the non-staining antioxidant.

For this reason, the stain-preventing rubber layer 112 contains no antioxidants or a small amount of non-staining antioxidant, while the black rubber layer 113 contains an antioxidant.

The stain-preventing rubber layer 112 having no antioxidant or small amount of non-staining antioxidant effectively prevents the colored layer 111 from being stained by the antioxidant contained in black rubber layer 113, since the area of the colored layer in contact with the surface of the stain-preventing rubber layer 112 oriented outwardly in the tire width direction is same as or smaller than that of the stain-preventing rubber layer 112.

According to the tire of the present invention, as shown in FIG. 2, the radially outermost edge of the stain-preventing rubber layer 112 is located in an area where the amount of tensile deformation is small even when the tire rolls under a load. More specifically, the outermost edge is located radially inwardly relative to the position 104a where the tire has the maximum width. This arrangement effectively prevents the detachment of rubber layers at the interface therebetween.

As described above, the tensile deformation amount of the side portion 104 when the tire rolls under a load is smaller in an area that is radially interior relative to the position 104a where the tire has the maximum width. Thus, the stain-preventing rubber layer 112 having its radially outermost edge $P_O$ in the area with the small tensile deformation amount, as shown in FIG. 3, alleviates the concentration of stress on the interface of the rubber layers and effectively prevents the detachment of the rubber layers.

The radilly innermost edge $P_I$ of the stain-preventing rubber layer 112 is preferably located at a radial position that is radially outwardly away from the bead toe by at least 20% the length the cross-sectional height (SH) of the tire. This arrangement prevents both the radially inner and radially outer interfaces between the rubber layers from being subjected to a large compression-deformation, when the tire rolls under a load. The rubber layers are thus further effectively prevented from being detaching from each other.

Furthermore, the colored layer 111 formed near the radially exterior side of the tire generally exhibits high decorativeness and high visibility of marking. The radially innermost edge $P_I$ of the stain-preventing rubber layer 112 located at the above radial position thus also enables enhanced decorativeness and visibility of markings.

Still furthermore, as shown in FIG. 4, tires are often provided with a conventional curved seal 120 having an uneven surface near the rim line of the tire 110 to show the tire size and the like. In this case, placing the radially innermost edge $P_I$ of the stain-preventing rubber layer 112 at the above radial position can prevent the colored layer from overlapping with the carve seal 120. The visibility of the carved seal 120 can thus be retained.

As shown in FIG. 3, the black rubber layer 113 and the stain-preventing rubber layer 112 have boundary lines $l_O$ and $l_I$ therebetween in the cross-section as seen in the tire width direction. The radially outer boundary line $l_O$ can be inclined by an inclination angle $\theta_O$ with respect to the normal line $L_O$ extending from the position where the boundary line $l_O$ intersects with the outer surface of the side portion and from the axially outer edge on the outer surface of the side portion, such that the axially inner end of the boundary line $l_O$ extends in the direction toward the rotational axis $L_R$ of the tire. As illustrated, when the surface of the stain-preventing rubber layer 112 is axially inwardly depressed relative to its neighboring outer surface of the black rubber layer 113, the aforementioned "position where the boundary line intersects with the outer surface of the side portion" can be identified as the position where the straight or curved extension of the boundary line (i.e., extension obtained by extending the boundary line straightforwardly or with the curvature radius same as that of the boundary line) intersects with the outer surface of the side portion.

When the boundary line $l_O$ is for example a curved line, the inclination angle $\theta_O$ can be defined as an angle formed by the normal line $L_O$ and the tangent of the boundary line $l_O$ at the position where the boundary line $l_O$ intersects with the outer surface of the side portion 104. The same definition applies to the inclination angle $\theta_I$, which will be described below.

The boundary line $l_O$ having the inclination angle $\theta_O$ increases the area of the interface between the stain-preventing rubber layer 112 and the black rubber layer 113 as compared with the boundary line $l_O$ that extends perpendicular to the outer surface of the side portion 104. In other words, the inclined boundary line $l_O$ having the inclination angle $\theta_O$ can increase the contact area between the stain-preventing rubber layer 112 and black rubber 113.

The increased contact area between the rubber layers can prevent the stress, caused when the tire rolls under a load, from concentrated on the interface between the stain-preventing rubber layer 112 and the black rubber layer 113. This alleviation of the stress concentration results in less amount of deformation and thus the detachment of the rubber layers can be prevented.

The radially inner boundary line $l_I$ between the stain-preventing rubber layer 112 and the black rubber layer 113, in the cross-section as seen in the tire width direction, can be inclined by an inclination angle $\theta_I$ with respect to the normal line $L_I$ to the outer surface of the side portion 104 extending from the position where the boundary line $l_I$ intersects with outer surface of the side portion 104. The inner end of the boundary line $l_I$ extends in a direction away from the rotational axis $L_R$ of the tire. The stress concentration that occurs around the interface between the stain-preventing rubber layer 112 and the black rubber layer 113 when the tire rolls under a load can be thus reduced, so that the detachment is less likely to occur with the less amount of deformation.

In the embodiment shown in FIG. 3, the boundary lines $l_I$ and $l_O$ are inclined in the opposite directions with respect to the respective normal lines that extend from the points where the boundary lines intersect with the surface of the side portion. In this case, the volume of the rubber composition required to form the stain-preventing rubber layer 112, which degrades more rapidly than the black rubber layer 113, can be reduced compared with the case where both of the boundary lines are inclined in the same direction with respect to the normal lines that extend from the point where the boundary lines intersect with the tire outer surface. The reduction of the volume of the rubber composition that would degrade rapidly can enhance the durability performance of the tire, without causing the reduction in the surface area of the stain-preventing rubber layer 112 on which the colored layer 111 is provided.

Further in the embodiment shown in FIG. 3, the boundary line $l_O$ is inclined with respect to the normal line $L_O$ that extends from the point where the boundary line $l_O$ intersects with the outer surface of the tire side portion 104, such that the axially inner end of the normal line extends in a direction toward the rotational axis $L_R$ of the tire. The boundary line $l_I$ is inclined with respect to the normal line that extends from the point where the boundary line intersects with the outer surface of the tire, such that the axially inner end of the normal line extends in a direction away from the rotational axis $L_R$ of the tire.

These inclinations of the boundary lines allow the stain-preventing rubber layer 112 to have a large surface area that is oriented outwardly in the tire width direction without increasing the volume of the stain-preventing rubber layer 112. Such a large surface area allows the colored layer 111 to have a sufficient radial width, so that the colored layer can improve the decorativeness and the like. In addition, the interfaces between the rubber layers are disposed sufficiently away from the folded end of the carcass ply 106. This arrangements prevents the rubber layers from detaching from each other at the their interfaces, which may occur when the stain-preventing rubber layer is disposed close to the folded end of the ply.

When the inclination angles $\theta_O$ and $\theta_I$ are within a range of 10 to 60 degrees, or preferably within a range of 20 to 40 degrees, the contact area between the rubber layers can be even increased. This further prevents the stress from being concentrated on the interfaces between the rubber layers to thereby more effectively prevent the detachment of the rubber layers with less amount of deformation.

Preferably, in the embodiment shown in FIG. 3, the colored layer 111 has a minimum distance of at least 1 mm, or more preferably at least 2 mm, from the black rubber layer 113, with the stain-preventing rubber layer 112 therebetween. With this arrangement, the stain-preventing rubber layer 112 effectively prevents the infiltration of the antioxidant from the black rubber layer 113, so that the colored layer 111 wound not be stained by the black rubber layer 113.

The thickness T of the stain-preventing rubber layer 112 in the tire width direction can be accordingly also at least 1 mm, or more preferably at least 2 mm.

Further in the embodiment shown in FIGS. 3 and 4, the width W of the stain-preventing rubber layer 112 along the surface thereof between the radially outermost point and radially innermost point on the surface of the stain-preventing rubber layer 112 oriented outwardly in the tire width direction may be at least 5 mm or more and 40% or less the length of the cross-sectional height (SH) of the tire (for example, about 50 mm or less for tires of passenger vehicles). In this case, the colored layer 111, which is disposed on the surface of the stain-preventing rubber layer 112 and exposed on the outer surface of the side portion 104, can obtain a radially sufficient width (for example, 1 mm or greater) to provide the intended decorativeness and the visibility of the marking. Further in this case, the colored layer 111, disposed on the surface of the stain-preventing rubber layer 112, may as well obtain a sufficient distance from the black rubber layer to thereby being protected from staining. Moreover, the stain-preventing rubber layer 112 is disposed in an area where deformation amount is small even when the tire 110 rolls under a load. This arrangement effectively prevents the rubber layers from detaching from each other at the interface thereof.

In the illustrated embodiment, the radially outermost point and the radially innermost point are identified as the aforementioned radially outermost edge $P_O$ and the radially inner most edge $P_I$ of the stain-preventing rubber layer 112, respectively.

Still further, as illustrated in FIGS. 2 and 3, the stain-preventing rubber layer 112 may be shaped to define a recess depressed from the surrounding outer surfaces of the side portion in the tire width direction. The stain-preventing rubber layer 112 has the colored layer 111 within the recess to place the colored layer inside relative to the surrounding outer surface of the side portion in the tire width direction. In this case, the side portion would not contact with or rubbed against curbstones so that the colored layer 111 would not be damaged. This allows the decoration and markings on the tire to retain their good appearance for a long time. The term "depressed" as used herein means that, in a cross-section as seen in the tire width direction, the surface of the stain-preventing rubber layer 112 oriented outwardly in the tire width direction is positioned inside, in the tire width direction, the contour of the side portion in which the stain-preventing rubber layer 112 is disposed. The contour is shown by the virtual line in FIGS. 2 and 3.

Figure 5:
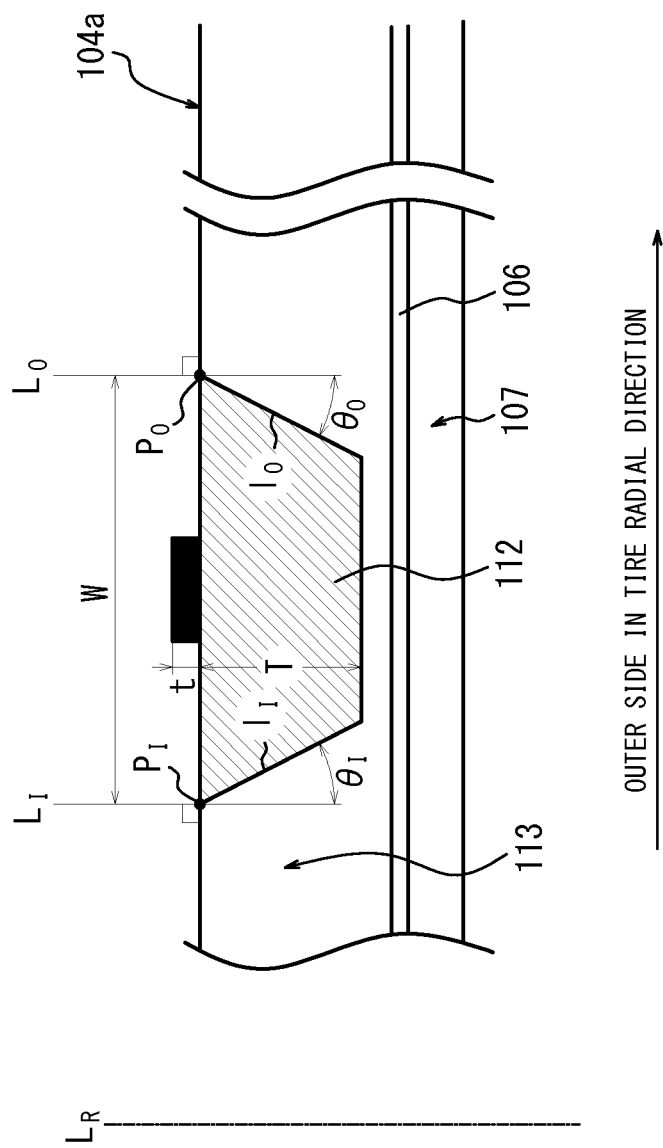
FIG. 5 is an enlarged, partial cross-sectional view of a color layer and its surroundings of a tire in accordance with another embodiment of the present invention.

In this embodiment, as shown in FIG. 5, the surface of the stain-preventing rubber layer 112 oriented outwardly in the tire width direction may be located outwardly in the tire width direction relative to the surfaces of stain-preventing rubber layer shown in FIGS. 2 and 3. In this case, the surface of the stain-preventing rubber layer 112 may serve as the same plane as that of the outer surface of the surrounding side portion 104 so that the decorativeness or the visibility of the marking imprinted on the colored layer 111 can be further enhanced.

As long as there is no inconsistency, features of a second tire and a third tire of the present invention, which will be described later, may be employed in the preferred embodiment of the first tire of the present invention.

<Embodiment Relating to Second Object>

A second tire of the present invention for achieving the aforementioned second object will be described in detail hereinafter, by illustrating an embodiment of the second tire. The second tire of the present invention includes a colored layer disposed at least a part of the outer surface of the tire, and an underlayer rubber disposed on the tire-interior side of the colored layer. The colored layer is formed by curing an ultraviolet (UV)-curable paint, and the underlayer rubber is made of a rubber composition containing 0 to 1.5 mass parts antioxidant per 100 mass parts rubber component. In the second tire of the present invention, the underlayer rubber disposed on the tire-interior side of the colored layer uses a rubber composition containing 1.5 mass parts or less the antioxidant per 100 mass parts the rubber component, to limit the migration (i.e., bloom) of the antioxidant toward the surface side. In the second tire of the present invention, the UV-curable paint forming the colored layer cures sufficiently when irradiated with UV light, and the colored layer adheres to the underlayer rubber disposed on the tire-interior side of the colored layer satisfactorily.

As described above, the rubber composition used for the underlayer rubber contains 0 to 1.5 mass parts antioxidant, or preferably less than 1.0 mass parts antioxidant, per 100 mass parts rubber component. When the rubber composition of the underlayer rubber contains the antioxidant in an amount exceeding 1.5 mass parts per 100 mass parts the rubber component, the migration (i.e., bloom) of the antioxidant toward the surface side is increased, so that the UV-curable paint, becoming the colored layer under UV radiation, is prevented from curing and the adhesion between the colored layer and the underlayer rubber disposed on the tire-interior side of the colored layer is decreased. Conversely, when the rubber composition of the underlayer rubber contains less than 1.0 mass part the antioxidant per 100 mass parts the rubber component, the UV-curable paint cures particularly satisfactorily under UV radiation, so that the colored layer adheres to the underlayer rubber further firmly.

Examples of the antioxidant include, for example,
N-phenyl-N'-(1,3-dimethylbutyl)-p-phenylenediamine (6PPD),
2,2,4-trimethyl-1,2-dihydroquinoline polymer (TMDQ),
6-ethoxy-2,2,4-trimethyl-1,2-dihydroquinoline (AW),
N,N'-diphenyl-p-phenylenediamine (DPPD),
N,N'-di-sec-butyl-p-phenylenediamine, and
N-phenyl-N'-(methylheptyl)-p-phenylenediamine.

The rubber component of the rubber composition used for the underlayer rubber may be natural rubber (NR) or synthetic rubber. Examples of the synthetic rubber here include synthetic polyisoprene rubber (IR), styrene-butadiene copolymer rubber (SBR), diene-based rubber such as polybutadiene rubber (BR), butyl rubber (IIR), halogenated butyl rubber [brominated butyl rubber (Br-IIR), chlorinated butyl rubber (Cl-IIR) and the like], and non-diene-based rubber such as ethylene-propylene-diene rubber (EPDM). These rubber components may be used alone or in combination of two or more thereof. In the present invention, the non-diene-based rubber is defined as a rubber whose ratio of the units derived from diene-based monomer to the monomer units constituting the non-diene-based rubber is 5 mol % or less. Examples of the diene-based monomer include 1,3-butadiene, isoprene, 1,3-pentadiene, 2,3-dimethylbutadiene, and examples of the monomer other than the diene-based monomer (i.e., non-diene-based monomer) constituting the non-diene-based rubber include ethylene, propylene, and isobutene.

In the second tire of the present invention, the rubber composition of the underlayer rubber preferably contains the non-diene-based rubber at least as part of the above rubber component. As described above, although the rubber composition of the underlayer rubber containing 1.5 mass parts or less the antioxidant per 100 mass parts the rubber component adheres very firmly to the colored layer, it exhibits low weather resistance, or specifically, it exhibits low ozone resistance, for example. The non-diene-based rubber is on the other hand highly weather-resistant, so that the rubber composition of the underlayer rubber that contains the non-diene-based rubber at least as part of its rubber component can improve the weather resistance of the underlayer rubber.

Preferably, in the rubber composition of the underlayer rubber, the rubber component contains the aforementioned non-diene-based rubber in an amount of at least 15% in weight. The underlayer rubber of such a composition highly improves its weather resistance.

The rubber composition of the underlayer rubber may further contain, other than the aforementioned rubber component and the antioxidant, fillers such as carbon black, vulcanizing agents such as sulfur, vulcanization accelerators, process oil, scorch retarders, zinc white, and stearic acid. Such compounding agents commonly used in the rubber industry can be arbitrarily selected and added to the rubber composition as long as they do not obstruct the achievement of objects of the present invention. Commercially available products may be preferably used as the compounding agents. To produce the rubber composition of the underlayer rubber, the compounding agents arbitrarily selected as necessary are mixed and kneaded with the rubber component, and then subjected to warming and extrusion.

In the second tire of the present invention, the colored layer is formed by curing the UV-curable paint. The UV-curable paint used here cures under UV radiation. The UV-curable paint normally consists mainly of a photopolymerization initiator, an oligomer, a monomer and a coloring agent. The UV-curable paint may further contain, for example, a UV absorber, an antioxidant, a light stabilizer, an adhesion promoter, a rheology modifier, and a dispersing agent, as necessary. The UV-curable paint used as the raw material of the colored layer of the tire of the present invention may be diluted with a solvent to adjust the viscosity.

As the photopolymerization initiator, a photo-radical polymerization initiator is generally used. Examples of the photopolymerization initiator in this embodiment include hydrogen-abstraction initiators, such as benzophenone, methyl ortho-benzoylbenzoate, 4-benzoyl-4'-methyl diphenyl sulfide, isopropylthioxanthone, diethylthioxanthone, 4-(diethylamino)methyl benzoate; intramolecular cleavage initiators, such as benzoin ether, benzoylpropyl ether, benzyl dimethyl ketal; α-hydroxyalkylphenone initiator, such as 2-hydroxy-2-methyl-1-phenylpropane-1-one, 1-hydroxycyclohexyl phenyl ketone, alkylphenyl glyoxylate, diethoxyacetophenone; α-aminoalkylphenon initiator, such as 2-methyl-1-[4-(methylthio)phenyl]-2-morpholinopropanone-1, 2-benzyl-2-dimethylamino-1-(4-morpholinophenyl)butanone-1; and acylphosphine oxide. These photopolymerization initiators may be used alone or in combination of two or more thereof. The amount of the photopolymerization initiator to be used is preferably in a range of 0.1 to 10.0% by weight of the total amount of the oligomer and the monomer, which will be identified below.

Examples of the oligomer include reactive oligomers, such as urethan(meth)acrylate, epoxy(meth)acrylate, polyester-(meth)acrylate, (meth)acrylate of acrylic resin. Compounds not having reactive functional groups may also be used as the oligomer as appropriate. "(Meth)acrylate" here includes both acrylate and methacrylate. The UV-curable paint preferably contains the oligomer in an amount within a range of 20 to 80% by weight.

The monomer is preferably an acrylate monomer or a methacrylate monomer. The acrylate monomer and the methacrylate monomer enables enhanced adhesion with the underlayer rubber and serves as a controller of the modulus of elasticity. These monomers are also required to adjust the viscosity of the coating liquid of the UV-curable paint. The compounding amount of the monomer is determined arbitrarily depending on the oligomer being used. Examples of the monomer include monofunctionnal monomers, such as 2-hydroxyethyl (meth)acrylate, 2-hydroxypropyl (meth) acrylate, 4-hydroxybutyl (meth)acrylate, 2-ethylhexylpolyethoxy (meth)acrylate, benzyl (meth)acrylate, isobornyl (meth)acrylate, phenoxyethyl (meth)acrylate, tricyclodecane mono(meth)acrylate, dicyclopentenyloxyethyl (meth) acrylate, tetrahydrofurfuryl (meth)acrylate, morpholine acrylate (acryloyl morpholine), N-vinyl caprolactam, 2-hydroxy-3-phenyloxypropyl (meth)acrylate, o-phenylphenyloxyethyl (meth)acrylate, isobonyl (meth)acrylate; difunctional monomers, such as neopentyl glycol di(meth)acrylate, neopentyl glycol dipropoxy di(meth)acrylate, hydroxy pivalic acid neopently glycol di(meth)acrylate, dimethylol tricyclodecane di(meth)acrylate, 1,6-hexane diol di(meth) acrylate, nonanediol di(meth)acrylate; and multifunctional monomers, such as trimethylolpropane tri(meth)acrylate, pentaerythritol tri(meth)acrylate, pentaerythritol tetra(meth) acrylate, dipentaerythritol hexaacrylate, tris[(meth)acryloxyethyl] isocyanurate, ditrimethylol propane tetra (meth) acrylate. Preferably, the UV-curable paint contains the monomer in an amount within a range of 10 to 80% by weight.

The coloring agent is added to make the colored layer be a color different from the color of the underlayer rubber. For example, for a black underlayer rubber, a coloring agent that imparts a color other than black is be used. As the coloring agent, organic or inorganic pigment, or organic or inorganic dye can be used in this embodiment. Examples of the inorganic pigment include titanium oxide. Examples of white coloring agent include titanium oxide, antimony white, zinc sulfide. Examples of red coloring agent include red iron oxide, cadmium red, red lead, mercury sulfide, cadmium, permanent red 4R, lithol red, pyrazolone red, watching red, calcium salt, lake red D, brilliant carmine 6B, eosine lake, rhodamine lake B, alizaline lake, brilliant carmine 3B, C.I. pigment red 2. Examples of blue coloring agent include C.I. pigment blue 15:3, C.I. pigment blue 15, prussian blue, cobalt blue, alkali blue lake, Victoria blue lake, phthalocyanine blue, metal-free phthalocyanine blue, partially chlorinated phthalocyanine blue, first sky blue, indanthrene blue BC. Examples of yellow coloring agent include chrome yellow, zinc yellow, cadmium yellow, yellow oxide, mineral first yellow, nickel titanium yellow, navel yellow, naphthol yellow S, Hansa yellow G, Hansa yellow 10G, benzidine yellow GR, quinoline yellow lake, permanent yellow NCG, tartrazine lake, C.I. pigment yellow 12. Preferably, the amount of the coloring agent used is in a range of 1 to 50% by weight of the total amount of the oligomer and the monomer.

Other compounding agents will be added to the UV-curable paint as appropriate to improve the weather resistance and heat resistance, or to adjust the viscosity.

In the present invention, the colored layer may be formed on the outer surface of the tire by applying the UV-curable paint to the underlayer rubber of a vulcanized tire by means of, for example, screen printing, ink jet printing, relief printing, or tampo printing, and then curing the applied paint through UV radiation. The colored layer may alternatively be formed on the outer surface of the tire by using in-mold coating which is achieved by curing, through UV radiation, the UV-curable paint applied on a releasing film and placing the obtained film in the mold when vulcanizing the tire.

The colored layer and the underlayer rubber of the second tire are preferably disposed on the sidewall of the tire. However, the location of the layers are not limited thereto, as long as the colored layer is disposed at least part of the outer surface of the tire and the underlayer rubber of a specific composition is disposed on the tire-interior side of the colored layer. However, the colored layer and the underlayer rubber effectively achieve their intended functions when disposed on the sidewall because the sidewall is the most conspicuous portion of a tire.

A preferred embodiment of the second tire of the present invention will be described in detail hereinafter, with reference to FIG. 6. The tire shown in FIG. 6 includes a pair of beads 201, a pair of sidewalls 202, a tread 203 continuously extending from the sidewalls 202, bead cores 204 embedded in the beads 201, a carcass 205 extending in a toroidal shape, and a belt 206 disposed radially outwardly relative to the crown of the carcass 205. The tire of shown in FIG. 6 further includes a colored layer 207 disposed on part of the tire outer surface of one of the sidewalls, and an underlayer rubber 208 disposed adjacent to colored layer 207 on the tire-interior side (or on the inner side in the tire width direction in the illustrated example).

The carcass 205 of the illustrated example, formed of a single carcass ply, includes a main body of a toroidal shape extending between the bead cores 204, and folded portions formed by rolling the carcass 205 along the bead cores 204 radially outwardly from the inner side to the outer side in the tire width direction. However, for the tire of the present invention, the number of the ply and the structure of the carcass 205 are not limited thereto. Further, in the illustrated tire, the carcass 205 includes the belt 206 composed of two belt layers disposed radially outwardly relative to the crown of the carcass 205. The belt layer is normally made of a rubber coated layer of a steel cord extended by being inclined with respect to the tire equatorial plane. The two belt layers form the belt 206 by being stacked such that the steel cords constituting the belt layers intersect with each other with the tire equatorial plane interposed therebetween. Although the belt 206 in the drawing consists of two belt layers, the number of the belt layers constituting the belt 206 can be three or more. Although the tire in FIG. 6 is intended for use with passenger vehicles, the use of the tire of the present invention is not limited thereto.

Figure 6:
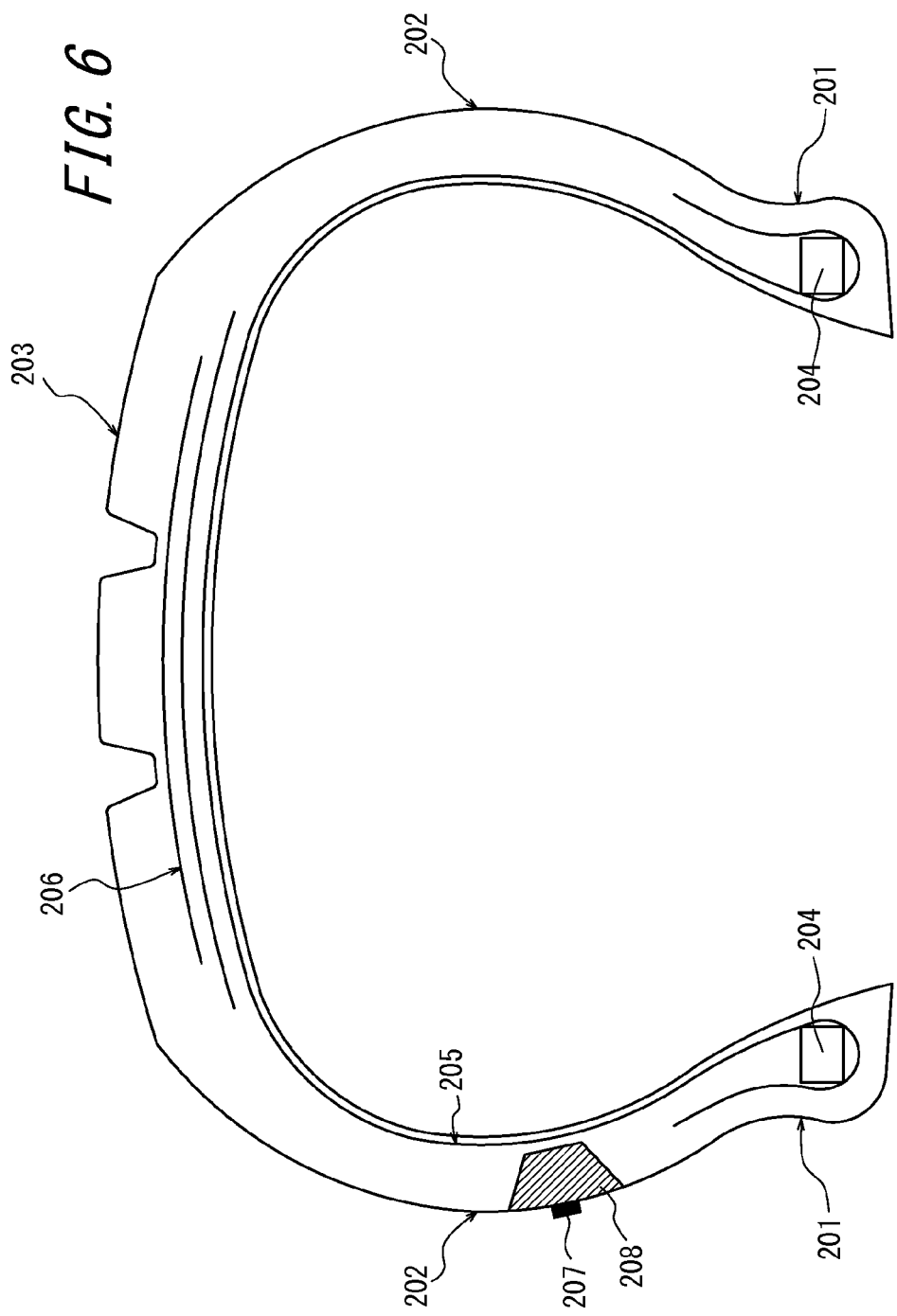
FIG. 6 is a cross-sectional view of a tire in accordance with a preferred aspect of the present invention.

In addition, the tire shown in FIG. 6 includes the colored layer 207 on the tire outer surface of the sidewall 202, and the underlayer rubber 208 under (or on the tire-interior side of) the colored layer at the position where the tire has the maximum width. However, the configuration of the tire of the present invention is not limited thereto. For example, the entirety of the side rubber disposed outwardly in the tire width direction relative to the carcass 205 of the sidewall 202 may serve as the underlayer rubber 208, and the colored layer 207 may be disposed on such an underlayer rubber. The tire having such a configuration is also one of a preferred embodiments of the present invention.

As long as there is no inconsistency, features of the first tire and a third tire of the present invention, which will be described below, may be employed in the preferred embodiment of the second tire of the present invention.

<Embodiment for Achieving Third Object>

A third tire of the present invention for achieving the aforementioned third object will be described in detail hereinafter, with reference to the accompanying drawings.

Figure 8A:
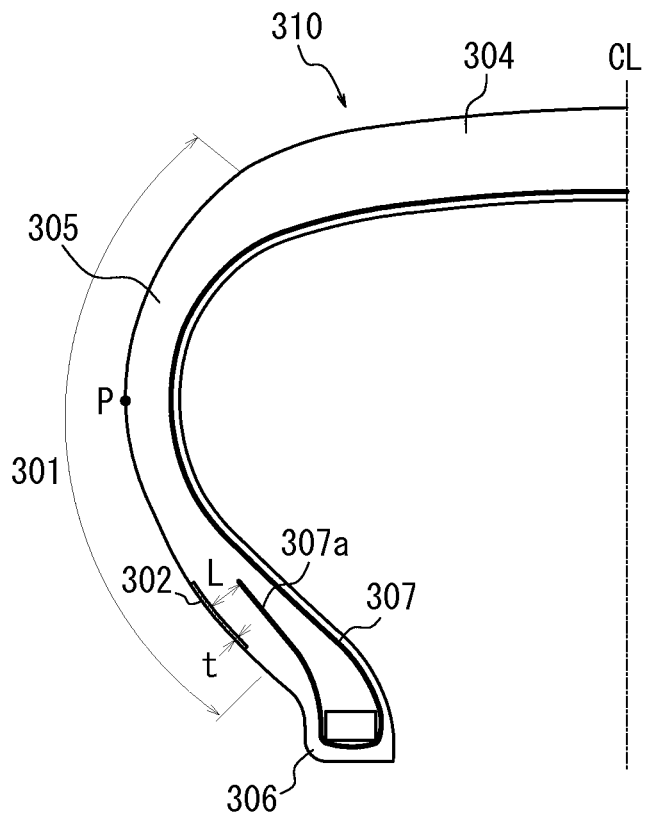
FIG. 8 is cross-sectional view of a half portion of a tire, as seen in the tire width direction, in accordance with one embodiment of the present invention.

FIG. 7 is a side view of a tire according to one embodiment of the present invention, and FIG. 8 is a cross-sectional view of the half portion of the tire shown in FIG. 7 as seen in the tire width direction.

The tire 310 shown in FIG. 7 includes a belt-shaped colored layer 302 on the surface of its side portion 301. The colored layer has a color different from the color of the base color (typically black) of the tire. The colored layer 302 has a marking 303 imprinted thereon with a color different from the color of the colored layer 302. In the illustrated example, the marking 303 is "ABCDEFG"; however, the marking is not limited thereto. The marking 303 may be company name, brand name, tire size, the date of manufacture, etc. represented by character(s), figure(s), sign(s) including bar codes, pattern(s) or any combination thereof.

In this embodiment, as shown in FIG. 8, each side portion 301 includes a sidewall 305 continuously extending from the lateral face of a tread 304 toward the radial interior, and a bead 306 extending continuously from the sidewall 305 toward the radial interior. More specifically, the side portion 301 is defined as the portion from the outer edge of the tread surface in the tire width direction to the rim fitting of the bead 306.

The tire with the colored layer 302, which has a color different from the base color of the tire, attracts user's attention to the colored portion when displayed in new condition. The marking 303 imprinted on the colored layer 302 can thus be emphasized so that the user's purchasing interest should be stimulated. Further, the marking 303, which is of a color different from the color of the colored layer 302, should be highly visible.

In the third tire of the present invention, the colored layer is preferably formed by placing a colored rubber or formed by printing. More specifically, the colored layer 302 is preferably formed by placing and vulcanizing a colored rubber as part of a sidewall rubber or formed by printing an ink.

The colored layer 302 formed by placing a colored rubber can retain its color even when the side portion 301 wears to a certain extent, so that the colored layer 302 can maintain the aforementioned advantage for a long time.

On the other hand, the colored layer 302 formed by printing can develop its color easily but satisfactorily.

The marking 303 is preferably formed by printing an ink, painting a paint, or putting a seal. The seal is preliminarily formed separately from the tire 310 before attached to the colored layer.

The colored layer 302, formed by one of the above methods, preferably has a thickness t of 1 to 200 μm, because the colored layer having a thickness of less than 1 μm may be too thin to satisfactorily mask the base color, and the colored layer having a thickness of over 200 μm may be too thick to avoid fissure.

The colored layer 302 has suffered from cracks and subsequent fissures that may occur as the tire is used. This problem may be solved by adjusting a distance L between the colored layer 302 and the ply cord 370 in the carcass 307. It is important to keep the distance L equal to or less than 4.0 mm, as shown in FIG. 8.

Figure 8B:
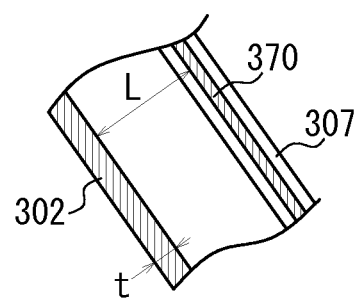
Figure 9:
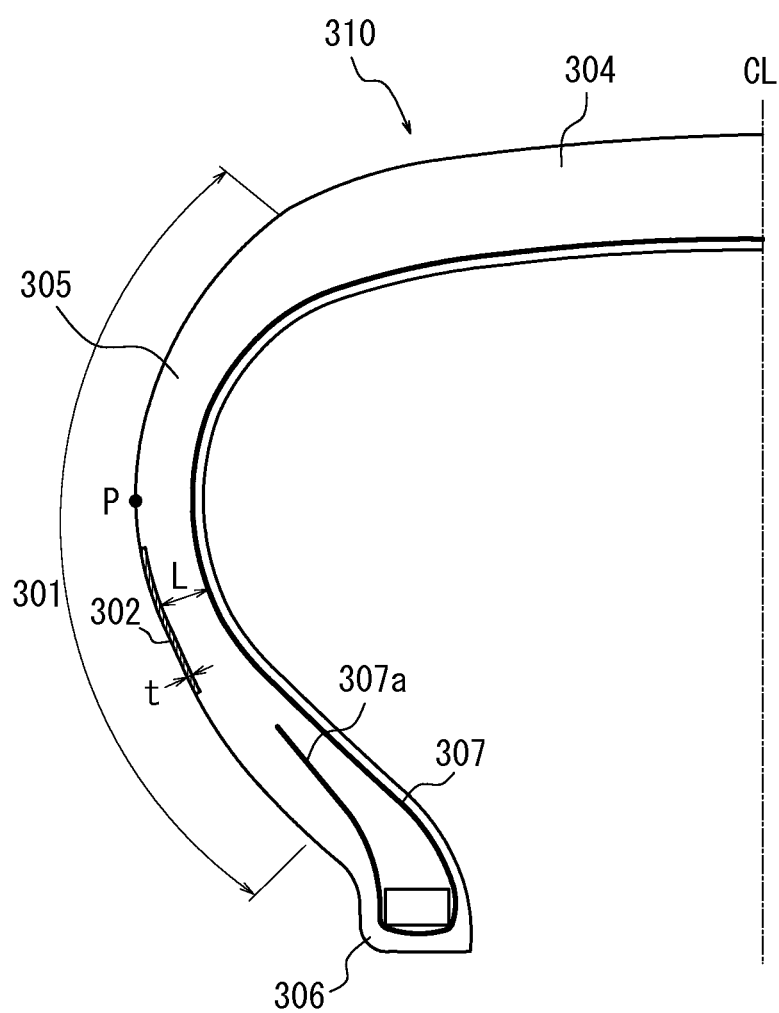
FIG. 9 is a cross-sectional view of a half portion of a tire, as seen in the tire width direction, in accordance with another embodiment of the present invention.

Specifically, the distance L is identified as the minimum distance between the colored layer 302 and the outermost carcass in the tire width direction that faces the colored layer, as shown in FIG. 8B; that is, the distance L is the minimum distance between the colored layer 302 and the ply cords of the folded portion 307a of the carcass 307 in the illustrated example. When the colored layer 302 is located radially outwardly relative to the end of the folded portion 307a as shown in FIG. 9, the distance L is the minimum distance between the colored layer 302 and the ply cords 370 in the main body of the carcass 307. In the third tire of the present invention, the colored layer 302 is preferably radially spaced apart from the end of the carcass 307, as shown in FIG. 9.

The inventors of the present invention have diligently investigated the cause of the cracks generated in the colored layer 302 as the tire is used, and discovered that the surface deformation at the outer layer of the side portion, on which the colored layer 302 is provided, largely affects the generation of cracks. In a word, the inventors have discovered that the surface deformation at the outer layer of the side portion occurring when the tire rolls generates the cracks.

The inventors have subsequently sought a solution for reducing the surface deformation, and found that adjusting the distance between the colored layer and the ply cords in the carcass effectively reduces the surface deformation. Specifically, the aforementioned distance L of 4.0 mm or less reduces the surface deformation to thereby prevent or reduce the generation of cracks.

The distance L needs to be kept equal to or less than 4.0 mm continuously over the entirety of the colored layer 302. It is important that the distance L does not exceed the length of 4.0 mm continuously over the entirety of the colored layer 302.

Preferably, the distance L is at least 0.5 mm, considering the workability during the manufacture of the tire.

Furthermore, the colored layer 302 preferably has a brightness of at least 80%. Typical tires are black in their base color (i.e., having a brightness of 0%), and thus the colored layer 302 having a color close to white (i.e., having a brightness closer to 100%), can attracts user's attention. This will also attracts user's attention to the marking 303 imprinted on the colored layer 302.

Conversely, the marking 303 preferably has a brightness of 20% or less. The marking 303 having a brightness of 20% or less can provide a large difference in brightness with respect to the colored layer 302 when the colored layer 302 serving as a background has a brightness of 80% or greater as above. Such a difference in brightness improves the visibility of the marking.

For example, when the colored layer 302 is white (i.e., having a brightness of 100%) and the marking is black (i.e., having a brightness of 0%), the marking 303 is highly visible and satisfactorily attracts user's attention.

Moreover, the colored layer 302 and the marking 303 preferably have a difference of 70% or greater in their saturation levels. This is because a large difference in saturation enables high visibility of the marking 303 even when the marking 303 does not have a large difference in brightness with respect to the colored layer 302 serving as the background.

For example, when the colored layer 302 is green (i.e., having a saturation of 70%) and the marking 303 is white (i.e., having a saturation of 0%), the marking 303 is highly visible and satisfactorily attracts user's attention.

In the third tire of the present invention, the side portion preferably has a protrusion extending outwardly from the surface of the side portion in the tire width direction. The protrusion preferably has the colored layer.

Figure 10:
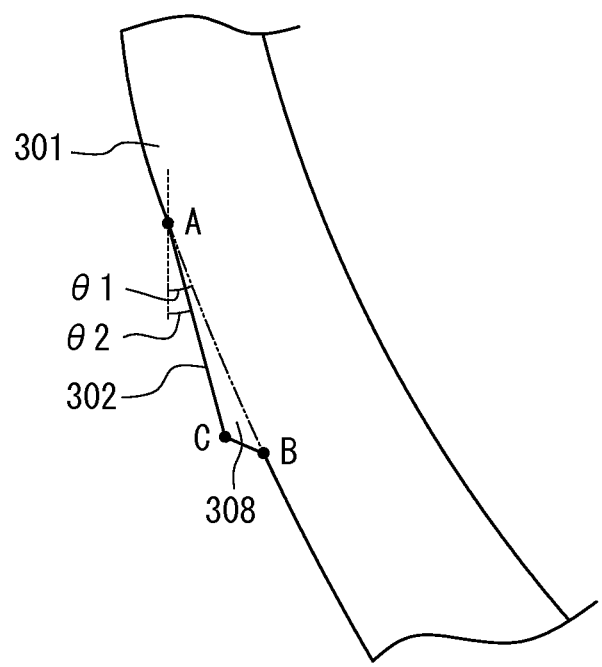
FIG. 10 is an enlarged cross-sectional view of a colored layer formed on the side portion of a tire in accordance with another embodiment of the present invention.

FIG. 10 is an enlarged cross-sectional view of the side portion of the tire according to another embodiment of the colored layer 302 of the present invention. In this second embodiment, the side portion 301 has a protrusion 308 extending outwardly from the surface of the side portion 301 in the tire width direction. The protrusion 308 includes a plane having an inclination angle $\theta 2$ that is smaller than the inclination angle $\theta 1$ that is the degree of inclination of the surface of the side section 301 without the protrusion 308 with respect to the direction parallel to the tire equatorial plane CL. (The surface of the side section 301 without the protrusion 308 is shown by the chain line in FIG. 10.) The plane serves as the colored layer 302.

As shown in FIG. 10, the inclination angle $\theta 1$ is larger when the protrusion 308 is provided near the bead 306 that is located radially inwardly relative to the position P where the tire has the maximum width than when it is provided near the position P. Thus, when the side portion does not include the protrusion 308, the circumference of the tire at the point A, which lies radially exterior side, is longer than the circumference of the tire at the position B, which lies radially interior side. This length difference in the circumference causes the lower portion (i.e., the portion at the point B) of the characters of the marking 303 imprinted on the colored layer 302 to be displayed narrowly. The protrusion 308 is thus provided to reduce the length difference between the circumference passing the point A and the circumference passing the apex C of the protrusion 308. The marking 303 imprinted on the plane of the colored layer 302 defined by the point A and the apex C would not be suffered from the aforementioned problem so that the visibility of the marking is improved.

The protrusion 308 may be formed by vulcanization which is performed after the placement of the colored rubber, or may be formed by using the same rubber as the rubber used for the other portion of the sidewall rubber and printing the colored layer 302 on the resulting surface of the protrusion.

To advantageously prevent the generation of cracks in the colored layer 302, the colored layer 302 is preferably largely spaced apart from the end of the folded portion 307a. Such arrangement is shown in FIGS. 11 and 12.

Figure 11:
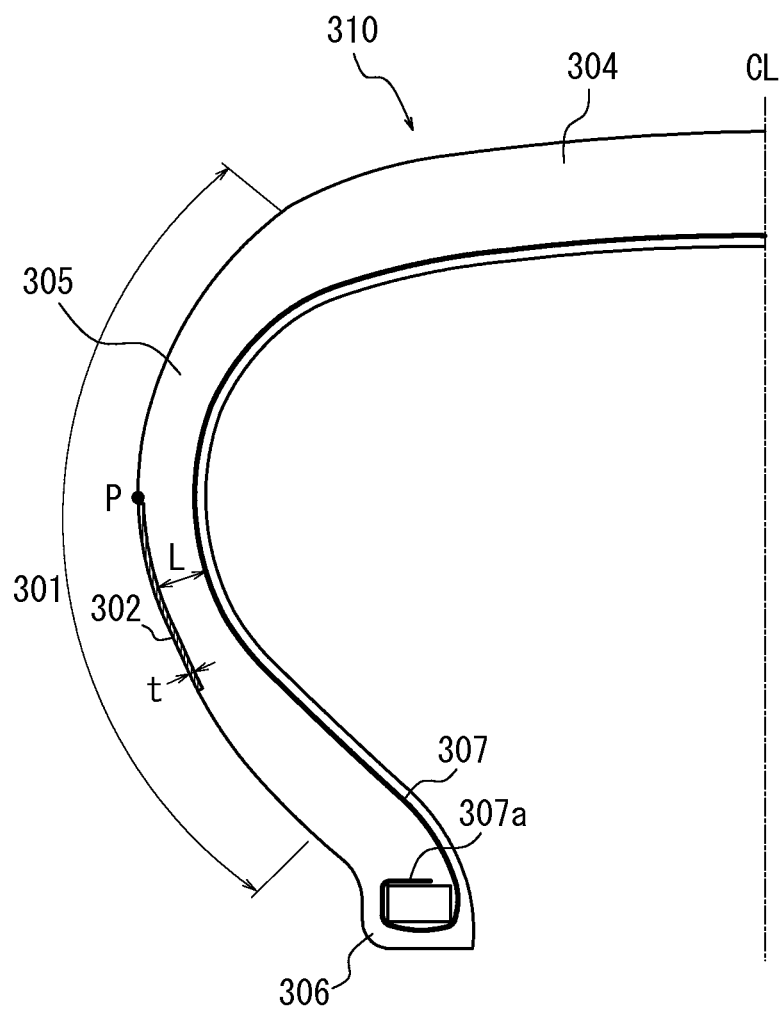
FIG. 11 is a cross-sectional view of a half portion of a tire, as seen in the tire width direction, in accordance with another embodiment of the present invention.
Figure 12:
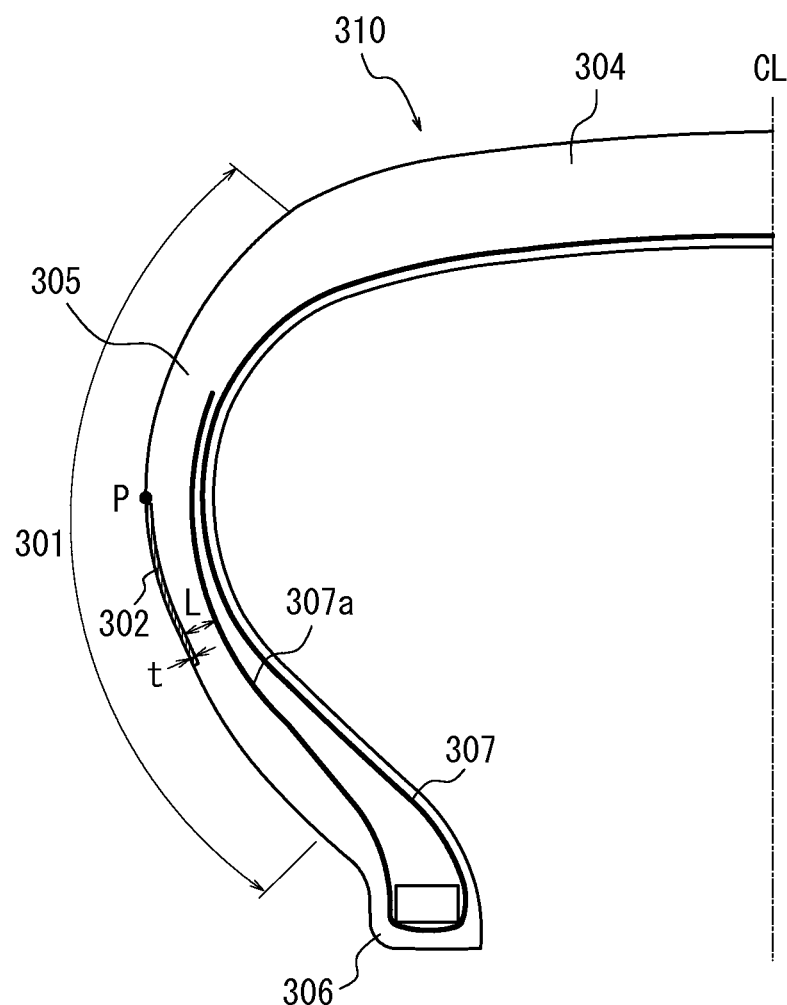
FIG. 12 is a cross-sectional view of a half portion of a tire, as seen in the tire width direction, in accordance with another embodiment of the present invention.

Specifically, in the tire of FIG. 11, the folded portion 307a is formed by bending the carcass along the bead core and placing the end of the folded portion 307a on the bead core. In the tire of FIG. 12, the folded portion 307a is formed by extending the carcass radially outwardly and placing the end of the folded portion 307a radially outwardly relative to the colored layer 302.

In the third tire of the present invention, the rubber gouge of the side portion is preferably 3.5 mm or less.

As long as there is no inconsistency, features of the first and the second tires of the present invention, which has been already described in the above, may be employed in the preferred embodiment of the third tire of the present invention.

<definitions>

The dimensions as used herein, such as the inclination of boundary lines between the rubber layers, in the cross-section as seen in the tire width direction, are measured in a tire that is mounted on an applicable rim, filled with air under a predetermined inner pressure, and being subjected to no load.

The term "cross-sectional height of the tire" refers to half the length obtained by subtracting the rim diameter of the applicable rim from the outer diameter of the tire.

The term "maximum width of the tire" refers to, when it is a solid tire, the maximum linear width between the surfaces of the side portion, aside from the protrusions such as patterns, characters, and rim guards formed on the lateral face of the tire. When it is a pneumatic tire, it refers to the maximum linear width between the sidewalls, aside from the protrusions such as patterns, characters, and rim guards formed on the lateral face of the tire. The maximum linear width of the pneumatic tire is measured when the tire is mounted on an applicable rim, filled with an air of a defined air pressure, and being subjected to no load.

The term "applicable rim" refers to a rim that is defined by the industrial standards valid in the corresponding area where the tire is produced or used. Examples of the industrial standards include, for example, Year Book issued by Japan Automobile Tire Manufacturers Association (JATMA) in Japan, Standards Manual issued by European Tyre and Rim Technical Organisation (ETRTO) in Europe, and Year Book issued by The Tire and Rim Association Inc. (TRA) in the United States.

The terms "predetermined inner pressure" and "defined air pressure" refer to the pressure of the air being filled in the tire in accordance with the maximum load capacity of the tire (i.e., maximum air pressure), which is defined by the aforementioned standards, such as JATMA, depending on the size of the tire. The term "maximum load capacity" refers to the maximum mass allowed to put on the tire, which is also defined by the aforementioned standards.

The term "air" used herein may be replaced by an inert gas such as nitrogen gas.

EXAMPLES

The present invention will be described in further detail hereinafter, by illustrating Examples. However, the present invention is not limited to the following Examples.

<<First Tire>>

Tires for Examples and Comparative Example having a tire size of 195/65R15 were produced experimentally, and the performance thereof were evaluated. The details of the testing are described hereinafter.

Each of the tires for Examples and Comparative Example was provided with, at its side portion, a colored layer exposed on the outer surface of the side portion, a stain-preventing rubber layer having a surface oriented outwardly in the tire width direction on which the colored layer is disposed, and a black rubber layer disposed both the radially inner and outer sides of the stain-preventing rubber layer, as shown in FIG. 2.

The stain-preventing rubber layer of each of the Example and Comparative Example tires contained 90 mass parts butyl rubber, and that of Example tires 2 to 20 further contained 50 mass parts sheet-like clay. None of the tires contained any antioxidants in the stain-preventing rubber layer.

As shown in FIG. 2, the distance between the radially outermost edge of the stain-preventing rubber layer and the bead toe is denoted as $r_O$, and the distance between the radially innermost edge of the stain-preventing rubber layer and the bead toe is denoted as $r_I$.

The values of $r_O$ and $r_I$ for each of the Example and Comparative Example tires are shown in Table 1. In each of the Example and Comparative Example tires, the value shows 0.5 SH (i.e., 0.5 times the cross-sectional height of the tire) at the position where the tire the maximum width.

In the Example tires 4 to 20, the radially outer boundary line between the stain-preventing rubber layer and the radially outer black rubber layer in the cross-section as seen in the tire width direction was inclined by an inclination angle of $\theta_O$ with respect to the normal line to the tire outer surface extending from the point where the boundary line intersects with the tire outer surface. Here, when the inclination angle has a positive value, the axially inner end of the boundary line extends in a direction toward the rotational axis of the tire. When the inclination angle has a negative value, the axially inner end of the boundary line extends in a direction away from the rotational axis of the tire.

The radially inner boundary line between the stain-preventing rubber layer and the black rubber layer was inclined in the opposite direction from the radially outer boundary line by an inclination angle of $\theta_I=(-1\times\theta_O)$ with respect to the normal line to the tire outer surface extending from the point where the boundary line intersects with the tire outer surface. Here, when the inclination angle has a positive value, the axially inner end of the boundary line extends in a direction away from the rotational axis of the tire. When the inclination angle has a negative value, the axially inner end of the boundary line extends in a direction toward the rotational axis of the tire.

For each of the Example and Comparative Example tires, the minimum distance T between the colored layer and the black rubber layer having the stain-preventing rubber layer therebetween, and the length W of the surface of the stain-preventing rubber layer oriented outwardly in the tire width direction between the radially outermost and innermost points of the stain-preventing rubber layer along the surface are shown in Table 1. For each of the Example and Comparative Example tires, 40% the height of the cross-sectional height SH of the tire is identified as 50.3 (125.8× 0.4) mm.

<Stain Resistance Evaluation Test>

To test the stain resistance, the aforementioned Example and Comparative Example tires were allowed to stand for 30 days outdoors after being produced. The tires were then checked for the color change that might occur in the colored layers. Table 1 shows the results of this testing.

In Table 1, the evaluation results are expressed by indexes obtained by using the Comparative Example tire as a control. Greater values represents higher stain resistance.

<Detachment Resistance Evaluation Test>

To evaluate the resistance to detachment that may occur at the interfaces between the rubber layers, the Example and Comparative Example tires were mounted on rims having a size of 6JJ (which is a standard rim size defined by JATMA), filled with an air having a pressure of 240 kPa (which is the maximum standard pressure defined by JATMA), and subjected to a drum test. In the drum test, a drum load of 615 kg (which is the heaviest load defined by JATMA) was placed on the tires over a distance of 10,000 km at a drum speed of 60 km/h. The tires on which the test were performed were then checked for any detachment, and the total length of the detachment, if any, in the circumferential direction was measured for each tire. Table 1 shows the results of this testing.

In Table 1, the evaluation results are expressed by indexes obtained by using the Comparative Example as a control. Greater values represents higher detachment resistance.

TABLE 1

| | Example Tire 1 | Example Tire 2 | Example Tire 3 | Example Tire 4 | Example Tire 5 | Example Tire 6 | Example Tire 7 | Example Tire 8 | Example Tire 9 | Example Tire 10 | Example Tire 11 |
|---|---|---|---|---|---|---|---|---|---|---|---|
| Existence of Inorganic clay mineral in stein-preventing rubber layer | None | 50 mass parts sheet-like clay | | | | | | | | | |
| $r_O$ (SH) | 0.45 | 0.45 | 0.45 | 0.45 | 0.45 | 0.45 | 0.45 | 0.45 | 0.45 | 0.45 | 0.45 |
| $r_I$ (SH) | 0.15 | 0.15 | 0.25 | 0.25 | 0.25 | 0.25 | 0.25 | 0.25 | 0.25 | 0.25 | 0.25 |
| $\theta_O$ (°) | 0° | 0° | 0° | 5° | 15° | 25° | 30° | 35° | 45° | 55° | 65° |
| $D_I$ (mm) | 0.5 | 0.5 | 0.5 | 0.5 | 0.5 | 0.5 | 0.5 | 0.5 | 0.5 | 0.5 | 0.5 |
| W (mm) | 4 | 4 | 4 | 4 | 4 | 4 | 4 | 4 | 4 | 4 | 4 |
| Stain resistance | 100 | 110 | 110 | 110 | 110 | 110 | 110 | 110 | 110 | 110 | 110 |
| Detachment resistance | 110 | 110 | 115 | 115 | 117 | 120 | 120 | 120 | 117 | 117 | 115 |

| | Example Tire 12 | Example Tire 13 | Example Tire 14 | Example Tire 15 | Example Tire 16 | Example Tire 17 | Example Tire 18 | Example Tire 19 | Example Tire 20 | Comparative Example tire |
|---|---|---|---|---|---|---|---|---|---|---|
| Existence of Inorganic clay mineral in stein-preventing rubber layer | 50 mass parts sheet-like clay | | | | | | | | | None |
| $r_O$ (SH) | 0.45 | 0.45 | 0.45 | 0.45 | 0.45 | 0.45 | 0.45 | 0.45 | 0.45 | 0.55 |
| $r_I$ (SH) | 0.25 | 0.25 | 0.25 | 0.25 | 0.25 | 0.25 | 0.25 | 0.25 | 0.25 | 0.15 |
| $\theta_O$ (°) | −30° | 30° | 30° | 30° | 30° | 30° | 30° | 30° | 30° | 0° |
| $D_I$ (mm) | 0.5 | 1.0 | 2.0 | 2.5 | 2.5 | 2.5 | 2.5 | 2.5 | 2.5 | 0.5 |
| W (mm) | 4 | 4 | 4 | 6 | 40 | 60 | 4 | 50 | 5 | 4 |
| Stain resistance | 110 | 120 | 130 | 130 | 130 | 110 | 130 | 130 | 130 | 100 |
| Detachment resistance | 112 | 120 | 120 | 123 | 120 | 110 | 120 | 120 | 123 | 100 |

The results in Table 1 revealed that each of the Example tires having the radially outermost edge of the stain-preventing rubber layer that is located radially inwardly relative to the position where the tire has the maximum width significantly improved the detachment resistance, compared with the Comparative Example tire. Table 1 further revealed that detachment resistance was further improved by placing the radially innermost edge of the stain-preventing rubber layer at a radial position radially outwardly away from the bead toe by at least 20% the length of the cross-sectional height (SH) of the tire, or by inclining the boundary line between the stain-preventing rubber layer and the radially outer black rubber layer with respect to the normal line to the tire outer surface that extends from the point where the boundary line intersects with the tire outer surface.

Table 1 also revealed that the stain resistance of the painted layer against the antioxidant contained in the black rubber layer was improved by adding a butyl-based rubber or inorganic clay mineral to the stain-preventing rubber layer, or by increasing the minimum distance D between the colored layer and the black rubber layer that have the stain-preventing rubber layer therebetween.

<<Second Tire>>

<Preparation of UV-Curable Paint>

To prepare the UV-curable paint, 50 mass parts urethane acrylate, (UV-2000B, made by The Nippon Synthetic Chemical Industry Co., Ltd.), 25 mass parts phenyl glycidyl ether epoxy acrylate (R-128H, made by Nippon Kayaku Co., Ltd.), 25 mass parts phenoxyethyl acrylate (R-561, made by Nippon Kayaku Co., Ltd.), 1 mass part 1-hydroxycyclohexyl phenyl ketone (Irgacure 184, made by Ciba-Geigy Japan Ltd.), and 20 mass parts titanium oxide were mixed.

<Production of Rubber Composition and Tire>

Raw materials shown in Table 2 were mixed by using a Banbury mixer to prepare the rubber compositions. The obtained rubber compositions were used for the underlayer rubber of the sidewalls to produce tires for passenger vehicles having a tire size of 195/65R15 and having the structure shown in FIG. 6. Subsequently, the UV-curable paint prepared as above were applied to the surfaces of the sidewalls of the obtained tires with a thickness of 25 μm using an ink jet printing process. The ink composition (UV-curable paint) was then cured by using SUBZERO 085 (a UV lamp system, made by SYSTEM INTEGRATION, Inc., with a 100 W/cm output) at a 200 mJ/cm$^2$ total light intensity and 1200 mW/cm$^2$ peak illuminance. The total light intensity and the peak illuminance were measured with UV Power Puck (made by EIT Inc.), a UV actinometer. The decorated print layer (colored layer 207) was formed accordingly.

(1) Curability of Applied Paint

After applying the UV-curable paint and irradiating the paint with UV light, the curability of applied paint was evaluated by observing whether the paint applied to the tires under test had been cured. In Table 2, "Good" means the applied paint was cured, "Fair" means the applied paint was unevenly cured, and "Poor" means the applied paint was not cured.

(2) Adhesion of Colored Layer

To evaluate the adhesion of the colored layer, the tires under test were allowed to stand for 48 hours in a thermostatic oven whose temperature was set to 60° C., and a cross-cut adhesion test was performed on the colored layer of the tires in accordance with JIS K 5600-5-6. The results are expressed by indexes obtained by assuming as 100 the reciprocal of the numbers of the squares on the colored layer of Example tire 2-1 from which the colored layer was peeled off. Greater index values represent higher adhesion of the colored layer.

(3) Ozone Resistance and Discoloration

To evaluate the ozone-caused crack resistance and the degree of discoloration, the tires under test were subjected to a drum running test under the following conditions. In evaluating the ozone-caused crack resistance, the colored layers were visually observed and rated based on a 0-to-5 scale, in which "0" represents that no cracking was observed and "5" represents that the result is extremely poor. In evaluating the degree of discoloration, the colored layers were also visually observed and rated based on a 1 to 5 scale, in which "1" represents that no discoloration was observed and "5" represents that severe discoloration was observed.

—Drum Conditions—

Load: 505 kg

Speed: 60 km/h

Pretreatment: none

Ozone concentration: 10 pphm

Running distance (drum): 10,000 km

TABLE 2

| | | | Comparative Example 2-1 | Example 2-1 | Example 2-2 | Example 2-3 | Example 2-4 |
|---|---|---|---|---|---|---|---|
| Combination | Natural Rubber | Mass parts | 50 | 50 | 50 | 50 | 50 |
| | Polybutadiene rubber *1 | | 50 | 50 | 50 | 50 | 30 |
| | Brominated butyl rubber *2 | | — | — | — | — | 20 |
| | Carbon black (FEF) | | 50 | 50 | 50 | 50 | 50 |
| | Stearic acid | | 2 | 2 | 2 | 2 | 2 |
| | Antioxidant *3 | | 2 | 1.5 | 0.8 | 0.2 | 0.2 |
| | Zinc white | | 3 | 3 | 3 | 3 | 3 |
| | Vulcanization accelerator *4 | | 0.4 | 0.4 | 0.4 | 0.4 | 0.4 |
| | Vulcanization accelerator *5 | | 0.2 | 0.2 | 0.2 | 0.2 | 0.2 |
| | Sulfur | | 1.4 | 1.4 | 1.4 | 1.4 | 1.4 |
| Performance | Curability of applied paint | — | Poor (Not cured) | Fair (Unevenly cured) | Good (Cured) | Good (Cured) | Good (Cured) |
| | Adhesion of colored layer | Index | — | 100 | 110 | 120 | 120 |
| | Ozone resistance | — | 1 | 1 | 2 | 3 | 1 |
| | Discoloration | — | 5 | 4 | 3 | 1 | 1 |

*1 Polybutadiene rubber (BR): diene-based rubber, BR-01 (made by JSR Corporation)
*2 Brominated butyl rubber (Br-IIR): non-diene-based rubber, Bromobutyl 2255 (made by JSR Corporation)
*3 Antioxidant: N-(1,3-dimethylbutyl)-N'-p-phenylenediamines, Nocrac 6C (made by Ouchi Shinko Chemical Industrial Co. Ltd)
*4 Vulcanization accelerator CZ-G: N-cyclohexyl-2-benzothiazolyl sulfenamide, Nocceler CZ-G (made by Ouchi Shinko Chemical Industrial Co. Ltd)
*5 Vulcanization accelerator DM-P: dibenzothiazyl disulfide, Nocceler DM-P (made by Ouchi Shinko Chemical Industrial Co. Ltd)

Comparison of Comparative Example 2-1 and Examples of 2-1 to 2-3 reveals that the underlayer rubber made of a rubber composition containing 0 to 1.5 mass parts antioxidant per 100 mass parts rubber component enables the UV-curable paint applied to the surface of the underlayer rubber to cure satisfactorily. The comparison further reveals that the underlayer rubber of such a rubber composition enables the colored layer, which is the UV-curable paint that has been applied and cured, to adhere to the tire (i.e., underlayer rubber) satisfactorily.

Comparison of Example 2-1 and Example 2-2 reveals that the rubber composition of the underlayer rubber that contains less than 1.0 mass part antioxidant per 100 mass parts rubber component improves curability of the UV-curable paint as well as adhesion between the tire (i.e., underlayer rubber) and the colored layer, which is the UV-curable paint that has been applied and cured.

Comparison of Example 2-3 and Example 2-4 reveals that the rubber composition of the underlayer rubber that contains the non-diene-based rubber at least as part of its rubber component improves weather resistance of the tire (i.e., underlayer rubber).

<<Third Tire>>

The colored layer 302 having a thickness t of 25 µm and a radial width of 3 mm was formed on the side portions of passenger vehicle tires having a tire size of 195/65R15, in accordance with the embodiment shown in FIGS. 7 and 8. Specifically, the colored layer 302 of a thickness of 25 µm was formed by applying the UV-curable paint to the side portion by using an ink jet printing process. The ink composition was then cured under the conditions of 200 mJ/cm$^2$ total light intensity and 1200 mW/cm$^2$ peak illuminance by using SUBZERO 085 (a UV lamp system, made by SYSTEM INTEGRATION, Inc., with a 100 W/cm output). The total light intensity and the peak illuminance were measured with a UV actinometer, Power Puck (made by EIT Inc.). The decorated print layer was formed accordingly.

The above tires are each provided with a different distance L between the colored layer 302 and the folded portion 307a of the carcass. Such tires are produced experimentally by changing the thickness of the side rubber.

The decorated tires were evaluated by a drum running test. The tires mounted on applicable rims and adjusted to contain an air of predetermined pressure were subjected the drum running test at a speed of 60 km/h. The tires were then checked for the peeling or cracking. Table 3 shows the results of the testing. In Table 3, the tires are rated "good" when peeling or cracking was not observed even after the tires have experienced a running distance of 8,000 km or more. Conversely, the tire are rated "poor" when peeling or cracking was observed even before the tires have experienced a running distance of 8,000 km.

TABLE 3

|  | Inventive Example 3-1 | Inventive Example 3-2 | Inventive Example 3-3 | Inventive Example 3-4 | Comparative Example 3-1 | Comparative Example 3-2 |
|---|---|---|---|---|---|---|
| Distance L (mm) from colored layer to ply cord | 3.0 | 2.0 | 1.0 | 4.0 | 4.2 | 5.0 |
| Gauge of side rubber (mm) | 2.5 | 1.5 | 0.5 | 3.5 | 3.7 | 4.5 |
| Crack Evaluation | Good | Good | Good | Good | Poor | Poor |

The results shown in Table 3 reveal that the tires having the distance L of 4.0 mm or less would not cause cracks in the colored layers even after the tires have experienced a running distance of 5,000 km.

REFERENCE SIGNS LIST

101 Tread
102 Sidewall
103 Bead
104 Side portion
104a Position of tire having maximum width
105 Bead core
106 Carcass ply
107 Inner liner
110 Tire
111 Colored layer
112 Stain-preventing rubber layer
113 Black rubber layer
120 Curved seal
$L_R$ Rotational axis of tire
$L_O$ Normal line to the outer surface of the side portion, extending from the point where the boundary line between the stain-preventing rubber layer and radially outer black rubber layer intersects with the outer surface of the side portion
$L_I$ Normal line to the outer surface of the side portion, extending from the point where the boundary line between the stain-preventing rubber layer and radially inner black rubber layer intersects with the outer surface of the side portion
$l_O$, $l_I$ Boundary lines between the stain-preventing rubber layer and the black rubber layer
$\theta_O$, $\theta_I$ Inclination angles of the boundary lines between the stain-preventing rubber layer and the black rubber layer
T Thickness of the stain-preventing rubber layer in the tire width direction
t Thickness of the colored layer
W Exposed width of the colored layer on the outer surface of the side portion in the tire radial direction
$r_o$ Distance between the radially outermost edge of the stain-preventing rubber and the bead toe
$r_1$ Distance between the radially innermost edge of the stain-preventing rubber and the bead toe
SH Cross-sectional height of the tire
201 Bead
202 Sidewall
203 Tread
204 Bead core
205 Carcass
206 Belt
207 Colored layer
208 Underlayer rubber
301 Side portion
302 Colored layer
303 Marking 304 Tread
305 Sidewall
306 Bead
307 Carcass
308 Protrusion
310 Tire
370 Ply cord

The invention claimed is:

1. A tire comprising a tread for contacting with a road surface, and a side portion that extends continuously from the tread, wherein:
   the side portion includes a black rubber layer containing an antioxidant, a stain-preventing rubber layer disposed adjacent to the black rubber layer, and a colored layer disposed on a surface of the stain-preventing rubber layer oriented outwardly in a tire width direction, the colored layer being exposed on an outer surface of the side portion;
   the stain-preventing rubber layer has an outermost edge in a tire radial direction, which is located radially inwardly relative to a position where the tire has the maximum width;
   the stain-preventing rubber layer comprises a rubber having air permeability lower than that of the black rubber layer;
   the stain-preventing rubber layer contains an inorganic clay mineral;
   the stain-preventing rubber layer and the black rubber layer include radially outer and inner boundary lines therebetween;
   in a cross-section as seen in the tire width direction, each of the boundary lines is inclined with respect to a normal line to the outer surface of the side portion, the normal line extending from a point where the boundary line intersects with the outer surface of the side portion, such that an inner end of the boundary line in a tire axial direction extends in a direction toward, or away from a rotational axis of the tire;
   the radially outer boundary line and the radially inner boundary line are inclined in opposite directions with respect to the rotational axis; and
   in the cross-section as seen in the tire width direction, each of the boundary lines between the stain-preventing rubber layer and the black layer is inclined within an angular range of 10 to 60 degrees with respect to the normal line to the outer surface of the side portion extending from the point where the boundary line intersects with the outer surface of the side portion.

2. The tire according to claim 1, wherein the stain-preventing rubber layer has a radially innermost edge, which is located at a radial position that is radially outwardly away from a bead toe by at least 20% a length of a cross-sectional height (SH) of the tire.

3. The tire according to claim 1, wherein the colored layer has a minimum distance of at least 1 mm from the black rubber layer, with the stain-preventing rubber layer interposed therebetween.

4. The tire according to claim 1, wherein, in the cross-section as seen in the tire width direction, the surface of the stain-preventing rubber layer oriented outwardly in the tire width direction has a length that is at least 5 mm and 40% or less the length of the cross-sectional height (SH) of the tire, the length being a distance between a radially outermost point and a radially innermost point of the stain-preventing rubber layer along the surface.

5. The tire according to claim 1, wherein:
   the stain-preventing rubber layer is at least partially shaped to define a recess depressed from the surrounding outer surfaces of the side portion in the tire width direction; and
   the recess includes the colored layer therein to place the colored layer inside relative to the surrounding outer surface of the side portion in the tire width direction.

6. The tire according to claim 1, wherein the stain-preventing rubber layer and ply cords of a carcass have a side rubber interposed therebetween.

* * * * *